(12) United States Patent
Shinde et al.

(10) Patent No.: US 11,970,278 B2
(45) Date of Patent: Apr. 30, 2024

(54) THRUST MOUNTS WITH LOAD-BALANCING THRUST LINK-LEVER

(71) Applicant: General Electric Company, Schenectady, NY (US)

(72) Inventors: Kudum Shinde, Bangalore (IN); Mahesh Shenvi Khandeparker, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 292 days.

(21) Appl. No.: 17/014,513

(22) Filed: Sep. 8, 2020

(65) Prior Publication Data

US 2022/0055757 A1 Feb. 24, 2022

(30) Foreign Application Priority Data

Jul. 14, 2020 (IN) .............................. 202011029953

(51) Int. Cl.
*F02C 7/20* (2006.01)
*B64D 27/26* (2006.01)

(52) U.S. Cl.
CPC ................ *B64D 27/26* (2013.01); *F02C 7/20* (2013.01); *B64D 2027/268* (2013.01); *F05D 2260/30* (2013.01)

(58) Field of Classification Search
CPC ........ B64D 2027/262; B64D 2027/264; B64D 2027/268
See application file for complete search history.

(56) References Cited

U.S. PATENT DOCUMENTS

| 3,844,115 | A | | 10/1974 | Freid | |
|---|---|---|---|---|---|
| 4,725,019 | A | | 2/1988 | White | |
| 5,319,922 | A | * | 6/1994 | Brantley | ................. F01D 25/24 244/54 |
| 5,320,307 | A | * | 6/1994 | Spofford | ................ B64D 27/18 60/797 |
| 5,385,013 | A | | 1/1995 | Barron et al. | |
| 5,443,229 | A | | 8/1995 | O'Brien et al. | |

(Continued)

FOREIGN PATENT DOCUMENTS

| CN | 107187606 A | 9/2017 |
|---|---|---|
| CN | 113167148 A | 7/2021 |

(Continued)

*Primary Examiner* — Todd E Manahan
*Assistant Examiner* — Marc J Amar
(74) *Attorney, Agent, or Firm* — Venable LLP; Elizabeth C. G. Gitlin; Michele V. Frank

(57) ABSTRACT

A thrust mount assembly includes a thrust link-lever that has a first end region, a second end region, and a fulcrum region disposed between the first end region and the second end region. A thrust link-lever may be coupled or couplable to a fulcrum body of an aft engine-mount at a fulcrum position of the thrust link-lever. When coupled to a turbomachine, the fulcrum position of the thrust link-lever may be laterally offset and/or laterally adjustable relative to an axis of rotation of the turbomachine. A load translated from an engine frame of a turbomachine to an engine-mounting linkage system may be determined and a fulcrum position for the thrust mount assembly may be adjusted laterally relative to an axis of rotation of the turbomachine.

25 Claims, 15 Drawing Sheets

(56) References Cited

U.S. PATENT DOCUMENTS

| | | |
|---|---|---|
| 5,452,575 A | 9/1995 | Freid |
| 5,524,847 A | 6/1996 | Brodell et al. |
| 5,620,154 A | 4/1997 | Hey |
| 6,126,110 A | 10/2000 | Seaquist et al. |
| 7,021,585 B2 | 4/2006 | Loewenstein et al. |
| 7,063,290 B2 | 6/2006 | Marche |
| 8,256,707 B2 | 9/2012 | Suciu et al. |
| 8,443,612 B2 | 5/2013 | Foster |
| 8,469,309 B2 | 6/2013 | Stuart et al. |
| 8,727,269 B2 | 5/2014 | Stuart et al. |
| 2003/0066928 A1* | 4/2003 | Brefort ............... B64D 27/26 244/54 |
| 2004/0251380 A1* | 12/2004 | Pasquer ............... B64D 27/26 244/54 |
| 2005/0081531 A1 | 4/2005 | Stretton et al. |
| 2008/0169377 A1* | 7/2008 | Levert ............... B64D 27/26 244/54 |
| 2009/0200419 A1* | 8/2009 | Levert ............... B64C 27/26 244/54 |
| 2009/0294580 A1* | 12/2009 | Sammito ............... B64D 27/26 244/54 |
| 2010/0116926 A1* | 5/2010 | Combes ............... B64D 27/26 244/54 |
| 2010/0127117 A1* | 5/2010 | Combes ............... B64D 27/26 244/54 |
| 2010/0181419 A1* | 7/2010 | Haramburu ............. B64D 27/26 244/54 |
| 2012/0305700 A1 | 12/2012 | Stuart et al. |
| 2014/0183298 A1 | 7/2014 | Brochard et al. |
| 2014/0217233 A1* | 8/2014 | Dezeustre ............. B64D 27/26 244/54 |
| 2014/0217234 A1* | 8/2014 | Dezeustre ............. B64D 27/10 244/54 |
| 2015/0069176 A1* | 3/2015 | Stretton ............... B64D 27/26 244/54 |
| 2016/0167798 A1 | 6/2016 | Prentice |
| 2017/0259929 A1 | 9/2017 | Stuart |
| 2018/0362170 A1 | 12/2018 | Stuart et al. |
| 2019/0032518 A1* | 1/2019 | Suciu ............... B64D 27/02 |
| 2019/0185170 A1 | 6/2019 | Schelfaut et al. |

FOREIGN PATENT DOCUMENTS

| | | |
|---|---|---|
| EP | 2202153 B1 | 8/2016 |
| EP | 3216699 A1 | 9/2017 |

* cited by examiner

THRUST MOUNTS WITH LOAD-BALANCING THRUST LINK-LEVER

CROSS-REFERENCE TO RELATED APPLICATION

This Application claims the benefit of priority under 35 U.S.C. § 119 to earlier-filed India Provisional Patent Application No. 202011029953, filed Jul. 14, 2020, the contents of which is incorporated herein by reference in its entirety as if set forth verbatim.

FIELD

The present disclosure generally pertains to linkage systems for mounting an engine to an aircraft.

BACKGROUND

Aircraft engines such as turbomachines may be mounted to an aircraft at various locations such as the wings, fuselage, or tail. Aircraft engines include gas turbine powered engines, electric engines, hybrid engines, and piston engines. An aircraft engine is typically mounted to an aircraft by a pylon. Generally, the engine is mounted to the pylon forward and aft or front and rear positions by an engine support structure. The engine support structure generally includes corresponding forward and aft or front and rear mounts for transferring various loads to the pylon. In addition to the forward and aft mounts, thrust mounts may be provided for transferring loads from the engine to the aft mount.

The loads transferred to the pylon typically include vertical loads such as the weight of the engine itself, axial thrust loads generated by the engine, lateral loads such as those due to wind buffeting, and roll loads or moments due to rotary operation of the engine. The mounts accommodate both axial and radial thermal expansion and contraction of the engine relative to the engine support structure. These various loads may cause a certain amount of deflection or bending of the engine. Engine deflecting or bending may impact operating clearances of rotational components of the engine, such as blade tip clearances within the fan, compressor, and/or turbine sections of the engine. Typically, an engine operates with sufficiently sized clearances to avoid blade tip rub encounters with surrounding engine structures.

The configuration and arrangement of the engine mounts can have certain effects on engine deflection or bending. A reduction in engine deflection or bending may reduce the incidence of blade tip rub encounters, which may allow for narrower blade tip clearances within the fan, compressor, and/or turbine sections of the engine. With narrower blade tip clearances, engine specific fuel consumption (SFC) may be improved.

Accordingly, there exists a need for improved engine support structures, and improved assemblies, systems, and methods associated with mounting an aircraft engine to an aircraft or other vehicle.

BRIEF DESCRIPTION

Aspects and advantages of the present disclosure will be set forth in part in the following description, or may be obvious from the description, or may be learned through practice of the presently disclosed subject matter.

In one aspect, the present disclosure embraces thrust mount assemblies for a turbomachine. An exemplary thrust mount assembly may include a thrust link-lever that has a first end region, a second end region, and a fulcrum region disposed between the first end region and the second end region. An exemplary thrust mount assembly may additionally include a first thrust link coupled or couplable to the first end region of the thrust link-lever, a second thrust link coupled or couplable to the second end region of the thrust link-lever, and/or an aft engine-mount comprising a fulcrum body. The thrust link-lever may be coupled or couplable to the fulcrum body of the aft engine-mount at a fulcrum position of the thrust link-lever. When coupled to a turbomachine, the fulcrum position of the thrust link-lever may be laterally offset and/or laterally adjustable relative to an axis of rotation of the turbomachine.

In another aspect, the present disclosure embraces methods of balancing a load in an engine frame of a turbomachine. An exemplary method may include determining a load translated from an engine frame of a turbomachine to an engine-mounting linkage system, with the engine-mounting linkage system including a thrust mount assembly coupled to the engine frame, and adjusting a fulcrum position for the thrust mount assembly laterally relative to an axis of rotation of the turbomachine.

In yet another aspect, the present disclosure embraces engine assemblies, such as engine assemblies secured to an aircraft. An exemplary engine assembly may include an aircraft engine that has a forward frame and an aft frame, an engine support structure of an aircraft that defines a location for mounting the aircraft engine to the aircraft. An exemplary engine assembly may additionally or alternatively include a forward engine mount connecting the forward frame of the engine to the engine support structure of the aircraft, an aft engine mount connecting the aft frame of the engine to the engine support structure of the aircraft, and a thrust mount assembly that has a fulcrum position of a thrust link-lever laterally offset and/or laterally adjustable relative to an axis of rotation of the turbomachine.

The thrust link-lever of an exemplary engine assembly may include a first end region, a second end region, and a fulcrum region disposed between the first end region and the second end region. A first thrust link may be coupled or couplable to the first end region, and a second thrust link may be coupled or couplable to the second end region. The thrust mount assembly may additionally or alternatively include an aft engine-mount that has a fulcrum body, and the thrust link-lever may be coupled or couplable to the fulcrum body at a fulcrum position of the thrust link-lever.

These and other features, aspects and advantages of the presently disclosed subject matter will become better understood with reference to the following description and appended claims. The accompanying drawings, which are incorporated in and constitute a part of this specification, illustrate embodiments of the present disclosure and, together with the description, serve to explain the principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended figures, in which.

DETAILED DESCRIPTION

Figure 1:
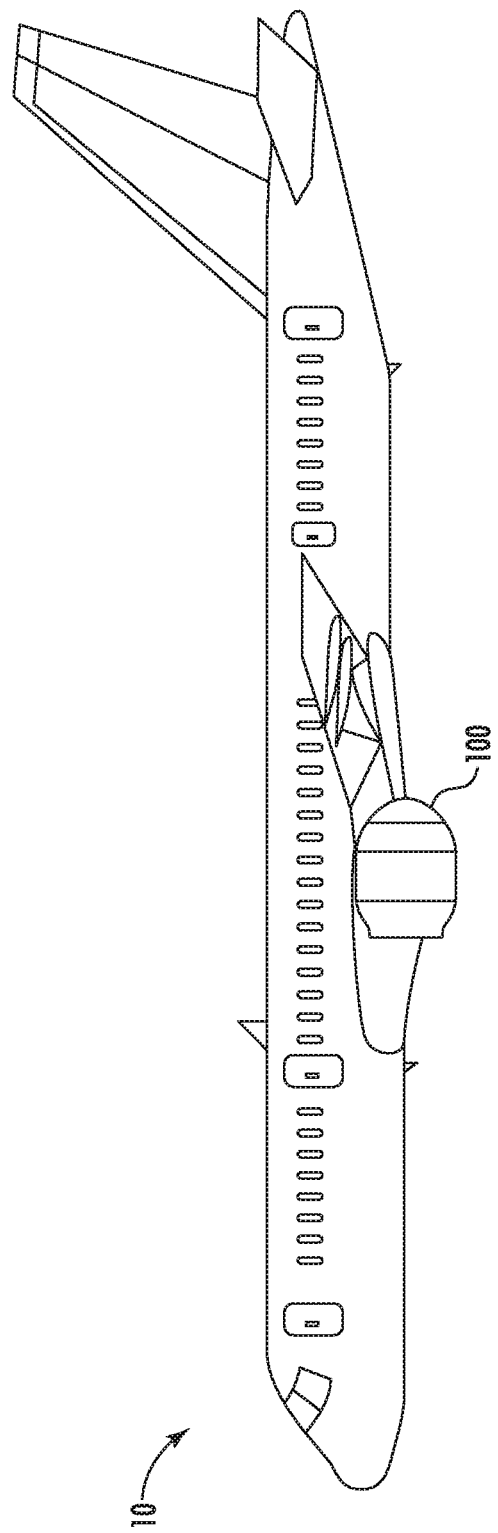
FIG. 1 schematically depicts a vehicle according to example embodiments of the present disclosure.

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope of the present disclosure. For example, features illustrated or described as part of one embodiment can be used with another embodiment to yield a still further embodiment. Thus, it is intended that the present disclosure covers such modifications and variations as come within the scope of the appended claims and their equivalents.

The present disclosure generally provides engine-mounting linkage systems for mounting an aircraft engine to an engine support structure of an aircraft. The presently disclosed engine-mounting linkage systems may include a thrust mount assembly that has left-side and right-side thrust links and a fulcrum body coupled or couplable to the thrust links. The fulcrum body may have a fulcrum position is laterally offset and/or laterally adjustable relative to the axis of rotation of the turbomachine, such that a right-side lever arm defined from the fulcrum position and extending towards the right-side thrust mount differs from a left-side lever arm defined from the fulcrum position extending towards the left-side thrust mount. The location of the laterally offset and/or laterally adjustable fulcrum position may be selected so as to provide respective lever arms that at least partially balance a load (e.g., a bending moment) in an engine frame, including a horizontal or lateral load and/or corresponding bending moment. In some embodiments, respective lever arms may be adjusted (e.g., using a fulcrum body with a laterally adjustable fulcrum position) to counteract or offset a load (e.g., a bending moment) associated with certain flight conditions and/or engine operating conditions that may otherwise cause a certain amount of deflection or bending of the engine backbone. One or more actuators may be actuated to change the fulcrum position of a fulcrum body and/or a thrust link-lever, thereby reducing engine deflection or bending. A reduction in engine deflection or bending may reduce the incidence of blade tip rub encounters, which may allow for narrower blade tip clearances within the within the fan, compressor, and/or turbine sections of the engine. Such narrower blade tip clearances may improve engine specific fuel consumption (SFC).

In another aspect, the present disclosure provides a control system and methods for controlling a fulcrum position and/or lever arm in an engine-mounting linkage system, such as a fulcrum position and/or lever arm of a thrust link-lever in a thrust mount assembly. For example, the control system and methods provided herein can be used to control a fulcrum position and/or lever arm to balance a load (e.g., a bending moment), minimize engine bending, or to optimize another engine parameter in real time, such as specific fuel consumption.

As used herein, the term "lever arm" refers to a perpendicular distance from an axis of rotation to a line of action of a load. The presently disclosed thrust mount assemblies may include a thrust link-lever that has a first lever arm and a second lever arm, with the first lever arm defined from a fulcrum position and extending towards a first thrust link coupled to a first end region of the thrust link-lever, and a second lever arm defined from the fulcrum position and extending towards a second thrust link coupled to a second end region of the thrust link-lever.

As used herein, the terms "coupled," "couplable," "coupling," and so forth refer to a physical attachment, connection, fastening, or joining of components, whether or not involving an intermediate component, as well as components that are integrally formed with one another. As used herein, the term "integrally formed," refers to components that are permanently coupled to one another, such as in the case of a monolithic body formed by an additive manufacturing process.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Furthermore, as used herein, the term "real time" refers to at least one of the time of occurrence of the associated events, the time of measurement and collection of predetermined data, the time to process the data, and the time of a system response to the events and the environment. In the embodiments described herein, these activities and events occur effectively instantaneously.

Exemplary embodiments of the present disclosure will now be described in further detail. FIG. 1 provides a vehicle 10 according to example embodiments of the present disclosure. The presently disclosed engine-mounting linkage systems, assemblies, and related method, and control systems can be implemented on an aircraft, such as a fixed-wing aircraft as shown, or on other suitable vehicles and/or structures, such as boats, submarines, trains, tanks, rotorcrafts, hovercrafts, and/or any other suitable vehicles that include one or more engines, such as one or more turbine engines(s) 100 (only one depicted in FIG. 1). While the present disclosure is described herein with reference to an aircraft, the scope of the present disclosure encompasses any other vehicle, and is not intended to be limited to aircraft embodiments.

Turbine engines can be operated in various operating phases. For example, a vehicle 10 such as an aircraft may include one or more turbomachines 100 that can be operated in a number of stable operation phases, such as climb, cruise, and descent phases of a flight envelope. The turbine engines 100 can also be operated in non-stable operation phases, such as during takeoff and aerial maneuvers. In stable operation phases, generally, the forces acting on the engine are less significant than those at non-stable phases. In some non-stable operation phases, e.g., during takeoff, the strain on the engine can be significant due to the various forces acting thereon. Particularly, the strain can cause engine bending and/or distortion of the engine backbone, which can result in reduced specific fuel consumption and efficiency, and can increase the rate of deterioration of engine components, among other undesired effects. The presently disclosed engine-mounting systems, assemblies, and related methods and control systems may reduce engine bending during operation of the turbine engines 100, including in stable and/or non-stable operation phases. Additionally, objective criteria of turbine engine operations, such as blade tip clearance parameters, may be optimizing during operation in stable and/or non-stable operation phases.

Figure 2:
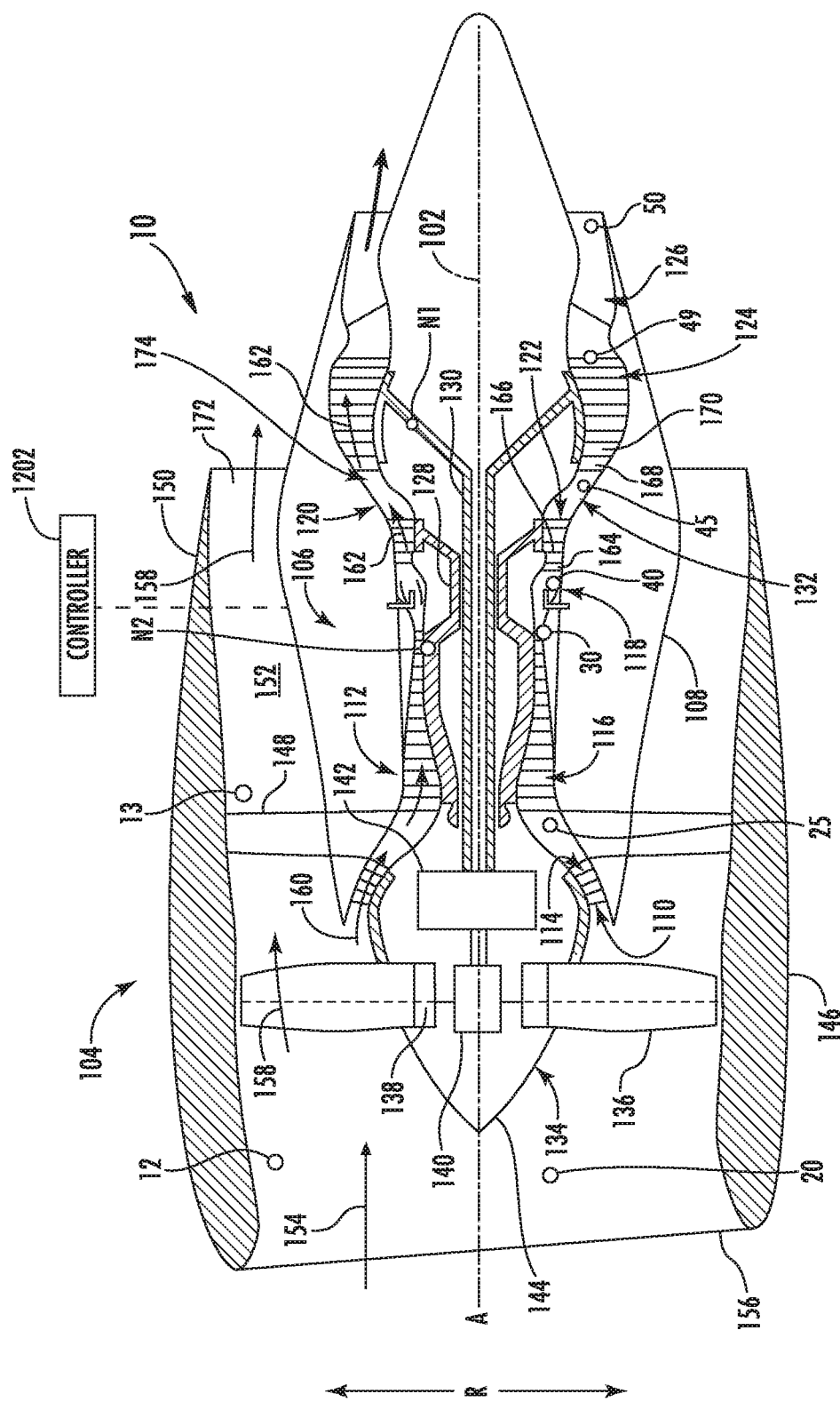
FIG. 2 schematically depicts a cross-sectional view of a turbomachine.

FIG. 2 provides a schematic cross-sectional view of an exemplary turbomachine 100. The turbomachine 100 shown in FIG. 2 is an aeronautical, high-bypass turbofan jet engine configured to be mounted to a vehicle 10, such as the fixed-wing aircraft shown in FIG. 1. The turbomachine 100 defines an axial direction A (extending parallel to or coaxial with an axial or longitudinal centerline 102 provided for reference), a radial direction R, and a circumferential direction (a direction extending three hundred sixty degrees (360°) around the longitudinal centerline 102).

The turbomachine 100 includes a fan section 104 and a core turbine engine 106 disposed downstream of the fan section 104. The core turbine engine 106 includes, by way of example, a substantially tubular outer casing 108 that defines an annular core inlet 110. The outer casing 108 encases, in a serial flow relationship, a compressor section 112 including a first, booster or low pressure (LP) compressor 114 and a second, high pressure (HP) compressor 116; a combustion section 118; a turbine section 120 including a first, HP turbine 122 and a second, LP turbine 124; and a jet exhaust nozzle section 126. An HP shaft or spool 128 drivingly connects the HP turbine 122 to the HP compressor 116. An LP shaft or spool 130 drivingly connects the LP turbine 124 to the LP compressor 114. The compressor section 112, combustion section 118, turbine section 120, and jet exhaust nozzle section 126 together define a core air flowpath 132 through the core turbine engine 106.

The fan section 104 includes a fan 134 having a plurality of fan blades 136 coupled to a disk 138 in a circumferentially spaced apart manner. The fan blades 136 extend outwardly from disk 138 generally along the radial direction R. The fan blades 136 and disk 138 are together rotatable about the longitudinal centerline 102 by the LP shaft 130 across a power gear box 142. The power gear box 142 includes a plurality of gears for stepping down the rotational speed of the LP shaft 130, e.g., for a more efficient rotational fan speed.

Referring still to FIG. 2, the disk 138 is covered by a rotatable spinner 144 aerodynamically contoured to promote an airflow through the plurality of fan blades 136. Additionally, the fan section 104 includes an annular fan casing 146 that circumferentially surrounds the fan 134 and/or at least a portion of the core turbine engine 106. Moreover, the fan casing 146 is supported relative to the core turbine engine 106 by a plurality of circumferentially spaced outlet guide vanes 148. Further, a downstream section 150 of the fan casing 146 extends over an outer portion of the core turbine engine 106 so as to define a bypass airflow passage 152 therebetween.

During operation of the turbomachine 100, a volume of air 154 enters the turbomachine 100 through an associated inlet 156 of the fan casing 146 and/or fan section 104. As the volume of air 154 passes across the fan blades 136, a first portion of the air 154, as indicated by arrows 158, is directed or routed into the bypass airflow passage 152 and a second portion of the air 154, as indicated by arrow 160, is directed or routed into core inlet 110 and downstream to the LP compressor 114 of the core turbine engine 106. The pressure of the second portion of air 160 is increased as it is routed through the HP compressor 116 and into the combustion section 118.

The compressed second portion of air 160 discharged from the compressor section 112 mixes with fuel and is burned within a combustor of the combustion section 118 to provide combustion gases 162. The combustion gases 162 are routed from the combustion section 118 along a hot gas path 174 to the HP turbine 122. At the HP turbine 122, a portion of thermal and/or kinetic energy from the combustion gases 162 is extracted via sequential stages of HP turbine stator vanes 164 that are coupled to the outer casing 108 and HP turbine rotor blades 166 that are coupled to the HP shaft or spool 128, thus causing the HP shaft or spool 128 to rotate, which supports operation of the HP compressor 116. The combustion gases 162 are then routed through the LP turbine 124 where a second portion of thermal and kinetic energy is extracted from the combustion gases 162 via sequential stages of LP turbine stator vanes 168 that are coupled to the outer casing 108 and LP turbine rotor blades 170 that are coupled to the LP shaft or spool 130, thus causing the LP shaft or spool 130 to rotate, which supports operation of the LP compressor 114 and/or rotation of the fan 134.

The combustion gases 162 are subsequently routed through the jet exhaust nozzle section 126 of the core turbine engine 106 to produce propulsive thrust. Simultaneously, the pressure of the first portion of air 158 is substantially increased as the first portion of air 158 is routed through the bypass airflow passage 152 before it is exhausted from a fan nozzle exhaust section 172 of the turbomachine 100, also producing propulsive thrust. The HP turbine 122, the LP turbine 124, and the jet exhaust nozzle section 126 at least partially define the hot gas path 174 for routing the combustion gases 162 through the core turbine engine 106.

With reference still to FIG. 2, it will be appreciated that the turbine engine 100 may be described with reference to certain stations, which may be stations set forth in SAE standard AS 755-D, for example. As shown, the stations can include, without limitation, a fan inlet primary airflow 20, a fan inlet secondary airflow 12, a fan outlet guide vane exit 13, an HP compressor inlet 25, an HP compressor discharge 30, an HP turbine inlet 40, an LP turbine inlet 45, an LP turbine discharge 49, and a turbine frame exit 50. Each station can have temperatures, pressures, mass flow rates, fuel flows, etc. associated with the particular station of the turbine engine 100. For example, a portion of air 154 at the LP turbine inlet 45 may have a particular temperature, pressure, and a mass flow. As shown, the fan speed N1 is representative of the rotational speed of the LP shaft or spool 130 and the core speed N2 is representative of the rotation speed of the HP shaft or spool 128. As will be explained herein, sensors can be positioned at these and/or other stations of the turbine engine 100 for determining various operating parameters during operation.

Figure 3:
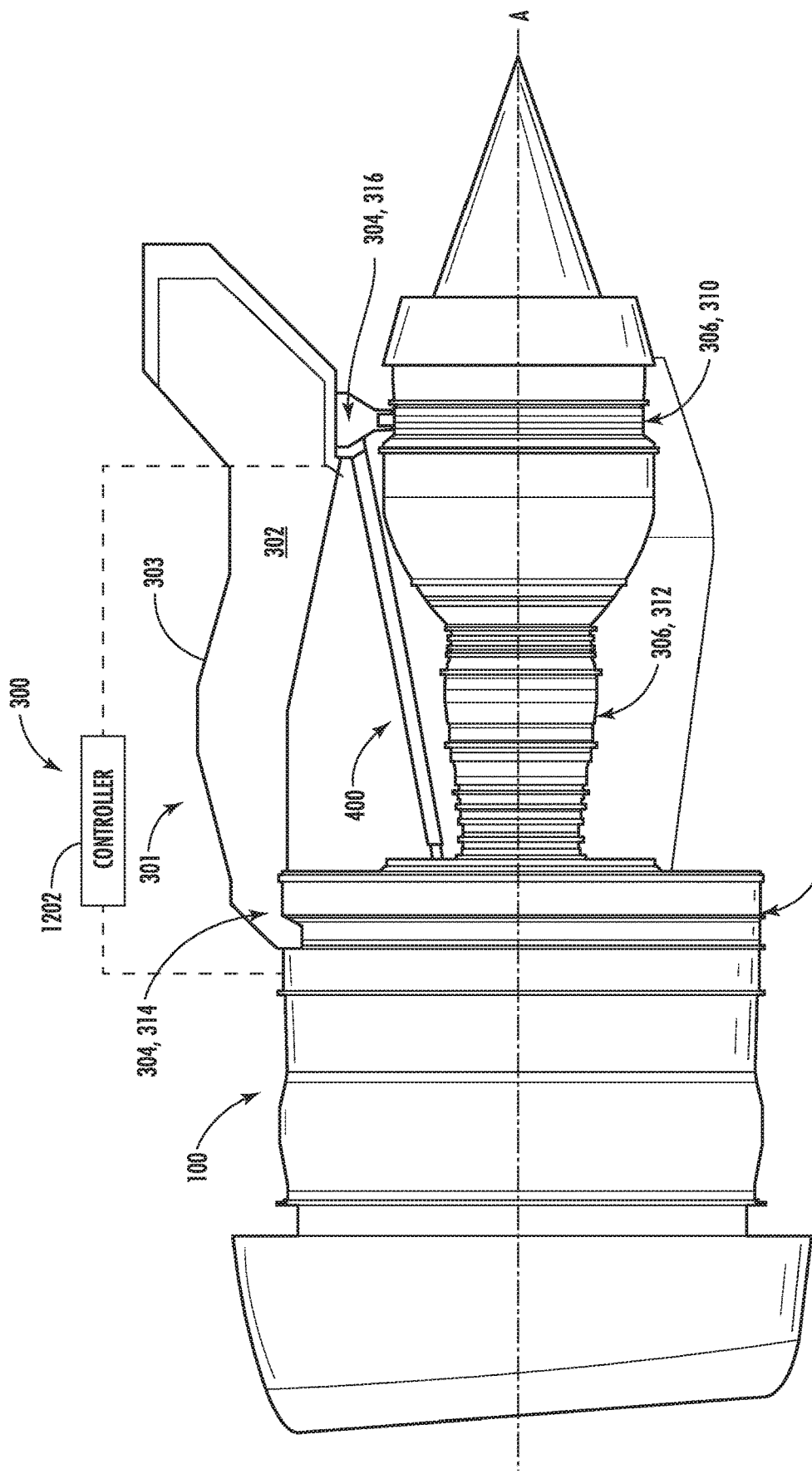
FIG. 3 schematically depicts a side view of an exemplary turbomachine mounted to a support structure of a vehicle.

Referring now to FIGS. 3, 4, 5A-5C, 6, 7, 8A and 8B, 9A and 9B, and 10, exemplary engine-mounting linkage systems 300 will be described. FIG. 3 shows a turbine engine 100 mounted to an engine support structure 302 of a vehicle 10. Exemplary engine-mounting linkage systems 300 such as those shown in the figures may be used to mount a turbine engine 100 to an engine support structure 302, providing an engine assembly 301 secured to a vehicle 10. The engine support structure 302 generally defines a location for mounting a turbine engine 100 to a vehicle 10. The engine support structure 302 may include a pylon 303 extending from the vehicle 10, such as from the wing, fuselage, or tail of an aircraft. In the case of an engine 100 mounted to a wing, the engine support structure 302 may extend downwardly beneath the wing.

As shown, an engine-mounting linkage systems 300 may include one or more engine-mounting links 304 coupled or couplable between an engine frame 306 and an engine support structure 302 of the vehicle 10. An engine-mounting linkage system 300 may be used to secure the engine 100 to the engine support structure 302. The engine support structure 302 may be connected to an engine frame 306 that supports the rotating components of the engine 100. The engine frame 306 typically includes a forward frame 308, an aft frame 310, and an engine casing 312 that connects the forward and aft frames 308, 310. The forward frame 308 may be disposed generally about the fan section 104 and/or the compressor section(s) 112 of a turbomachine engine 100. The aft frame 310 may be disposed generally about the turbine section(s) 120 of the engine 100. The engine casing 312 may sometimes be referred to as the "backbone" of the engine 100.

An engine 100 may be mounted and secured to an engine support structure 302 using one or more engine mounts 304. In an exemplary embodiment, an engine frame 306 may include a forward engine mount 314 and/or an aft engine-mount 316. The forward and/or aft engine-mounts 314, 316 may define respective portions of the forward and aft engine frame 308, 310. Additionally, or in the alternative, the forward and/or aft engine-mounts 314, 316 may be separate components respectively coupled to the forward and aft engine frame 308, 310.

Figure 4:
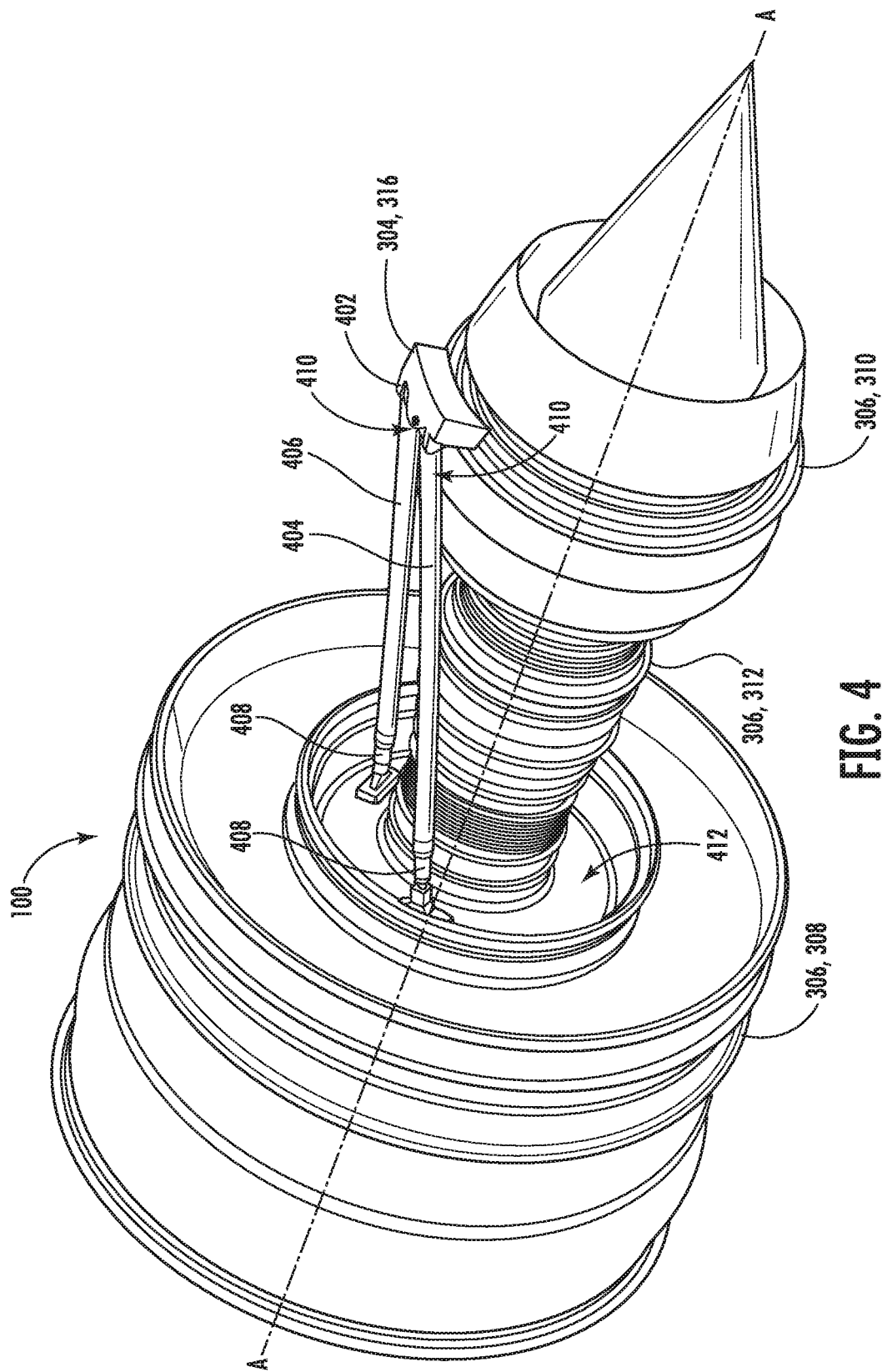
FIG. 4 schematically depicts a perspective view of an exemplary thrust mount assembly coupled to a turbomachine.

An engine-mounting linkage system 300 may include a thrust mount assembly 400. The thrust mount assembly 400 generally transfers axially directed thrust loads from the engine frame 306 to the engine support structure 302. For example, thrust loads providing forward propulsion may be transferred to the engine support structure 302 at least in part through the aft engine-mount 316. As shown in FIGS. 4 and 5A-5C, an exemplary thrust mount assembly 400 may include a thrust link-lever 402, a first thrust link 404 (e.g., a left-side thrust link), and a second thrust link 406 (e.g., a right-side thrust link). The respective forward ends of the first and second thrust links 404, 406 may be coupled to the engine frame 306. The respective aft ends of the first and second thrust links 404, 406 may be coupled to the engine mount 316. For example, as shown in FIG. 4, a forward end 408 of the first and second thrust links 404, 406 may be coupled to the forward fan frame 308, and an aft end 410 of the first and second thrust links 404, 406 may be coupled to the thrust link-lever 402.

In some embodiments, the forward ends 408 of the first and second thrust links 404, 406 may be coupled to a forward flange 412 of the forward engine frame 308. However, other locations for coupling the first and second thrust links 404, 406 to the engine frame 306 are also contemplated, and any configuration or arrangement for coupling the first and second thrust links 404, 406 to the engine frame 306 is within the scope of the present disclosure. For example, the first and second thrust links 404, 406 may be coupled to the core engine casing 312, or to a radially outward portion of the forward engine frame 308.

Figure 5A:
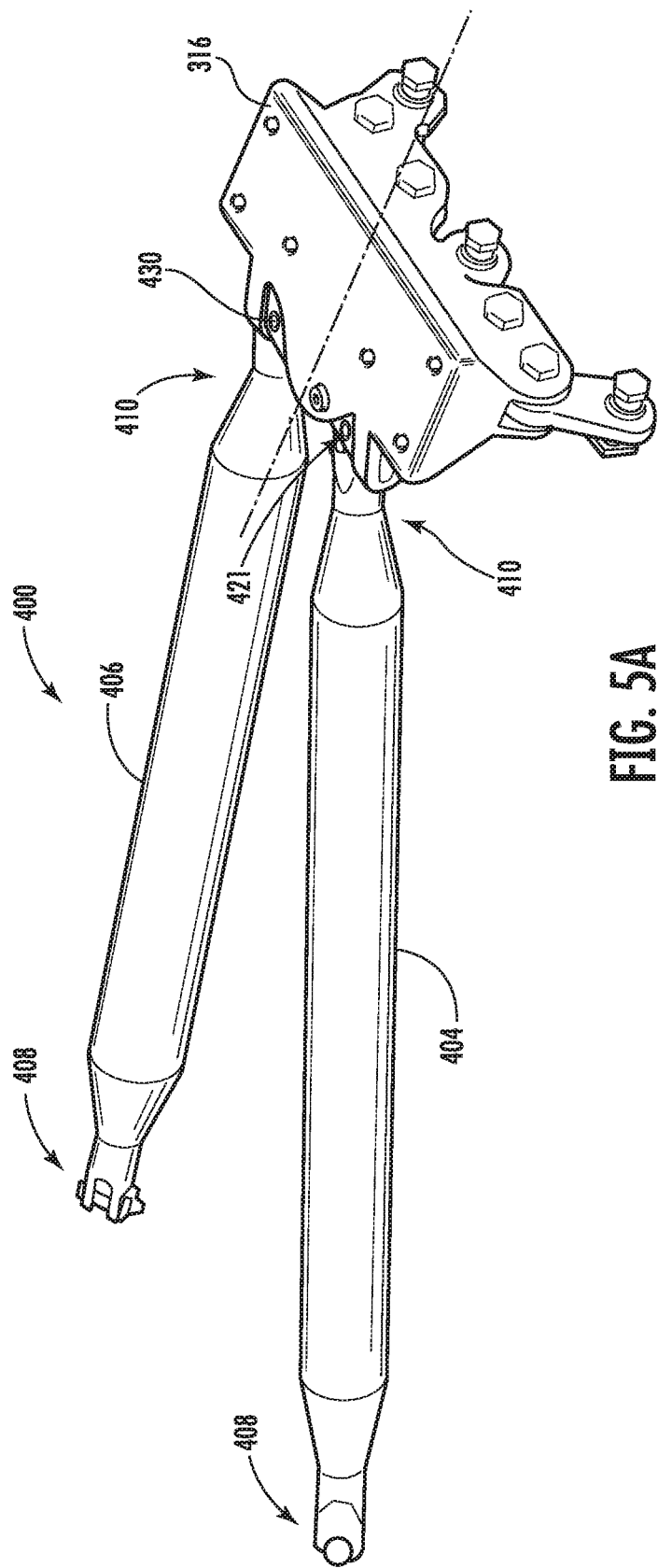
FIG. 5A schematically depicts a side perspective view of an exemplary thrust mount assembly.
Figure 5B:
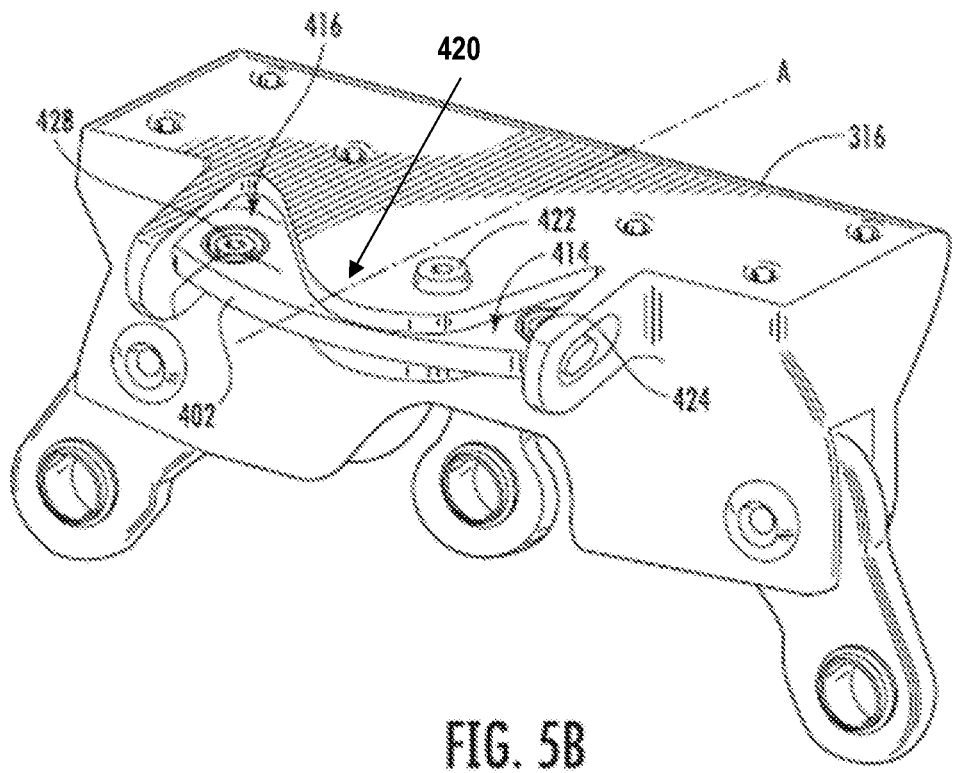
FIG. 5B schematically depicts a front perspective view of an exemplary aft mount assembly of the thrust mount assembly shown in FIG. 5A.
Figure 5C:
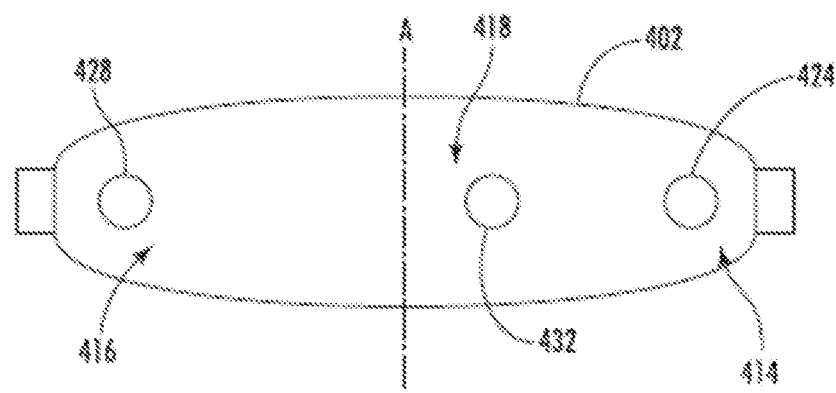
FIG. 5C schematically depicts a front perspective view of an exemplary thrust link-lever of the thrust mount assembly shown in FIG. 5A FIG. 6 schematically depicts a force diagram for an exemplary thrust mount assembly.

As shown in FIGS. 5A-5C, the aft ends 410 of the first and second thrust links 404, 406 may be coupled to respective ends of the thrust link-lever 402. As shown in FIGS. 5B and 5C, the thrust link-lever 402 may include a first end region 414 (e.g., a left-side end region), a second end region 416 (e.g., a right-side end region), and a fulcrum region 418 disposed between the first end region 414 and the second end region 416. The first thrust link 404 may be coupled to the first end region 414 of the thrust link-lever 402, and the second thrust link 406 may be coupled to the second end region 416 of the thrust link-lever 402. In some embodiments, the first and second thrust links 404, 406 may be coupled to the first and second end regions 414, 416, respectively, at least in part by a link pin, such as a pin, bolt, fastener, or the like. The link pins may be insertable through the thrust link-lever 402 and the thrust links 404, 406 so as to pivotably couple the thrust links 404, 406 to the thrust link-lever 402 to one another. Additionally, or in the alternative, in some embodiments the thrust links 404, 406 may be integrally formed with the thrust link-lever 402 and/or the thrust links 404, 406 and the thrust link-lever 402 may define respective portions of a monolithic body formed, for example, through an additive manufacturing process.

The thrust link-lever 402 may be coupled to the aft engine-mount 316, and the aft engine-mount 316 may be coupled to the aft engine frame 310 and/or the engine support structure 302. However, other locations for coupling the thrust link-lever 402 are also contemplated, and any configuration or arrangement operable for coupling the thrust link-lever 402 to the engine frame 306 and/or the engine support structure 302 is within the scope of the present disclosure. For example, the thrust link-lever 402 may be coupled to the engine support structure 302, or to the aft engine frame 310. In some embodiments, the thrust link-lever 402 may define a portion of the aft engine-mount 316, and/or the aft engine-mount 316 may define a portion of the thrust mount assembly 400. Additionally, or in the alternative, the aft engine-mount 316 may define a portion of the aft engine frame 310 and/or a portion of the engine support structure 302. In some embodiments, the thrust link-lever 402 may be integrally formed with the aft engine-mount 316 and/or the thrust link-lever 402, which may define respective portions of a monolithic body formed, for example, through an additive manufacturing process. Additionally, or in the alternative, the aft engine-mount 316 may be integrally formed with the aft engine frame 310 and/or the aft engine-mount 316, which may define respective portions of a monolithic body formed, for example, through an additive manufacturing process.

Regardless of the manner in which the thrust link-lever 402 is coupled or couplable to the engine-mounting linkage system 300 (e.g., at the aft engine-mount 316, at the aft engine frame 310, or at the engine support structure 302), a fulcrum body 420 may define the respective portion of the engine-mounting linkage system 300 coupled or couplable to the fulcrum region 418 of the thrust link-lever 402. For example, as shown in FIG. 5B, the fulcrum region 418 of the thrust link-lever 402 may be coupled to a fulcrum body 420 defined by the aft engine-mount 316. In some embodiments, the thrust link-lever 402 may be coupled to the fulcrum body 420 at least in part by a fulcrum pin 422, such as a pin, bolt, fastener, or the like. The fulcrum pin 422 may be insertable through the fulcrum body 420 and the fulcrum region 418 of the thrust link-lever 402 so as to pivotably couple the fulcrum body 420 and the thrust link-lever 402 to one another. Additionally, or in the alternative, in some embodiments the fulcrum region 418 of the thrust link-lever 402 may be integrally formed with the fulcrum body 420 and/or the thrust link-lever 402, which may define respective portions of a monolithic body formed, for example, through an additive manufacturing process.

Still referring to FIGS. 5A-5C, in some embodiments, the first end region 416 of the thrust link-lever 402 may include a first link aperture 424 operable for coupling the first thrust link 404 to the first end region 416 of the thrust link-lever 402. For example, the first thrust link 404 may be coupled to the first end region 414 of the thrust link-lever 402 at least in part by a first link pin 426, such as a pin, bolt, fastener, or the like. The first link pin 426 may pass through the first link aperture 424, and by way of example, opposite ends of the first link pin 426 may be coupled to the aft end 410 of the first thrust link 404. Additionally, or in the alternative, the second end region 416 of the thrust link-lever 402 may include a second link aperture 428 operable for coupling the second thrust link 406 to the second end region 416 of the thrust link-lever 402. For example, the second thrust link 406 may be coupled to the second end region 416 of the thrust link-lever 402 at least in part by a second link pin 430, such as a pin, bolt, fastener, or the like. The second link pin 430 may pass through the second link aperture 428, and by way of example, opposite ends of the second link pin 430 may be coupled to the aft end 410 of the second thrust link 406.

The fulcrum region 418 of the thrust link-lever 402 may include a fulcrum aperture 432 operable for coupling the thrust link-lever 402 to a fulcrum body 420, such as may be defined by a portion of the aft engine-mount 316 or other portion of the engine-mounting linkage systems 300 coupled or couplable to the fulcrum region 418 of the thrust link-lever 402. As shown in FIG. 5C, the fulcrum aperture 418 may be disposed between the first end region 414 and the second end region 416, such as between the first link aperture 424 and the second link aperture 428.

Figure 6:
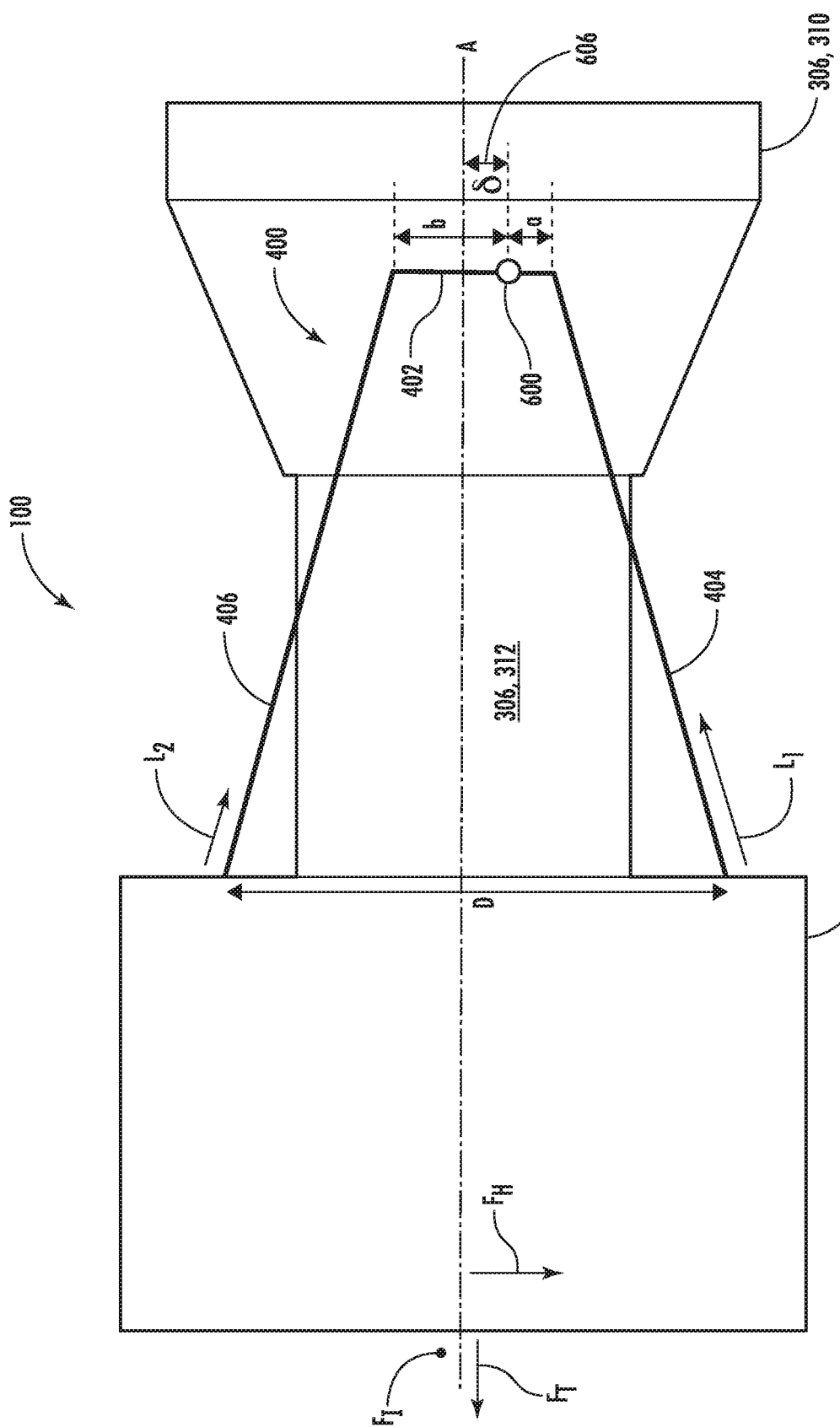

Now referring to FIG. 6, a force diagram for an exemplary thrust mount assembly 400 will be described. The force diagram shown in FIG. 6 is superimposed upon a top-down schematic view of a turbine engine 100. As shown, during operation, a turbine engine 100 may be subjected to a thrust load, represented by the vector $F_T$, and a horizontal load, represented by the vector $F_H$. The thrust load $F_T$ and/or the horizontal load $F_H$ may vary depending on flight conditions and/or engine operating conditions. The horizontal load $F_H$ may include an engine-induced load caused, for example, by rotational operation of the turbine engine 100. Additionally, the horizontal load $F_H$ may include an aerodynamically-induced load attributable, for example, to turning or other aerial maneuvers and/or cross-winds, and so forth. As a result, the turbine engine 100 may be subjected to sideways or horizontal aerodynamic loading. Additionally, or on the alternative, a turbine engine 100 may be subject to vertical (e.g., upward or downward) force vectors, as well as force vectors oriented with respect to any angle incident upon the engine 100. Additionally, during certain operating conditions, the turbomachine 100 may be subjected to an inlet load, represented by the vector $F_I$. The inlet load may be an aerodynamically-induced load caused, for example, by the axis of rotation A being pitched relative to approaching airflow. Any of these loads may induce a bending moment in the engine casing 312 (e.g., the backbone).

The presently disclosed thrust mount assemblies 400 may counteract or offset such bending moment, thereby mitigating bending of the engine casing 312 from its concentric position about the axis of rotation A. Maintaining concentricity of the engine casing 312 about the axis of rotation A is important from the standpoint of minimizing blade tip clearances, which has the beneficial effect of improving engine specific fuel consumption (SFC) and fuel burn. In addition, reduced backbone bending reduces the incidence of blade tip rub encounters with the surrounding engine structures, which promotes in-service performance retention.

In some embodiments the loads translated through the respective thrust links may differ from one another as a result of the thrust load $F_T$ and/or horizontal load $F_H$ under certain flight conditions and/or engine operating conditions. For example, as shown in FIG. 6, a first thrust link 404 (e.g., a left-side thrust link) may translate a first load $L_1$, and a second thrust link 406 (e.g., a right-side thrust link) may translate a second load $L_2$. In some embodiments, as shown, the first load $L_1$ may be greater than the second load $L_2$ under at least some flight conditions and/or engine operating conditions. Additionally, or in the alternative, the second load $L_2$ may be greater than the first load $L_1$ under at least some flight conditions and/or engine operating conditions. A difference in the load translated through the respective first and second thrust links 404, 406 may result in an unbalanced load or moment in the engine frame 306, which may introduce backbone bending.

The thrust mount assembly 400 may include a fulcrum position 600 that is laterally offset and/or laterally adjustable relative to the axis of rotation of the turbomachine. The lateral offset of the fulcrum position 600 may be selected such that the differing loads translated through the respective first and second thrust links 404, 406 may be at least partially balanced at the fulcrum position and/or by corresponding lever arms having respectively differing lengths. The fulcrum position 600 may be selected such that a first lever arm (a) 602, defined from the fulcrum position 600 and extending towards the first thrust link 404, differs from a second lever arm (b) 604, defined from the fulcrum position 600 and extending towards the second thrust link 406. The fulcrum position 600 may be laterally offset and or laterally adjustable to an offset distance ($\delta$) 606 defined from the axis of rotation A of the turbomachine so as to provide first and second lever arms (a) 602, (b) 604 that at least partially balance a load (e.g., a bending moment corresponding to differing loads translated through the respective first and second thrust links 404, 406).

For example, in the case of a first load $L_1$ translated through the first thrust link 404 being greater than a second load $L_2$ translated through the second thrust link 406, the offset distance ($\delta$) 606 may be selected such that the first lever arm (a) 602 is shorter than the second lever arm (b) 604. Additionally, or in the alternative, in the case of a second load $L_2$ translated through the second thrust link 406 being greater than a first load $L_1$ translated through the first thrust link 404, the offset distance ($\delta$) 606 may be selected such that the second lever arm (b) 604 is shorter than the first lever arm (a) 602. In exemplary embodiments, the offset distance ($\delta$) 606 may be selected such that the product of the first load $L_1$ and the first lever arm (a) is proportional and/or equal to the product of the second load $L_2$ the second lever arm (b). For example, the offset distance may be selected such that $L_1(a)=L_2(b)$.

Figure 7:
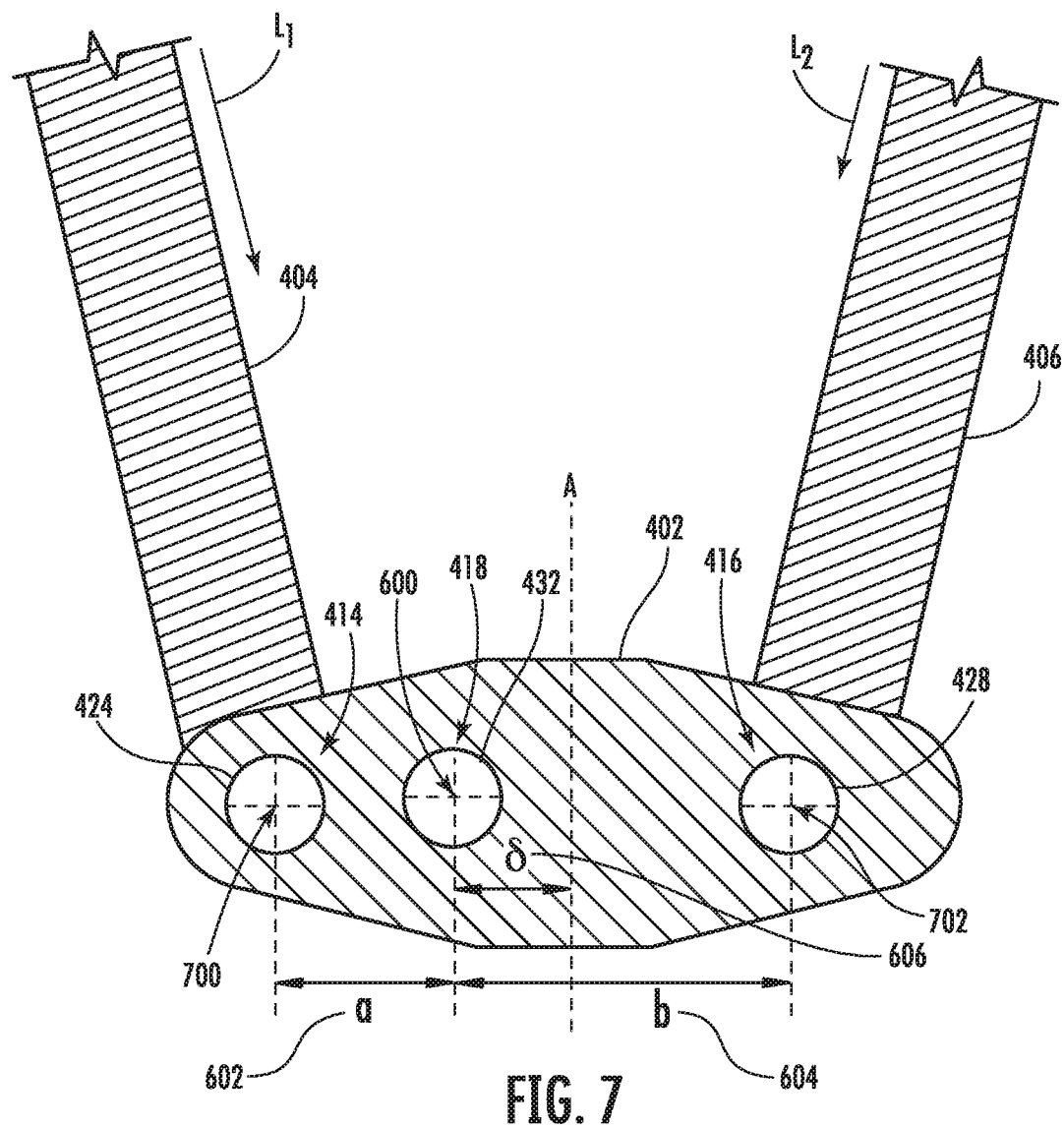
FIG. 7 schematically depicts an exemplary thrust mount assembly with a thrust link-lever that includes a laterally offset fulcrum position.

As shown in FIG. 7, the fulcrum position 600 may be a fixed position. The first lever arm (a) 602 may have a length extending from the fulcrum position 600 to a first load point 700 corresponding to the line of action of the first load $L_1$ translated to the thrust link-lever 402 from the first thrust link 404, and the second lever arm (b) 604 may have a length extending from the fulcrum position 600 to a second load point 702 corresponding to the line of action of the second load $L_2$ translated to the thrust link-lever 402 from the second thrust link 406. The first load point load 700 may correspond to a point on the thrust link-lever 402 where the first thrust link 404 is coupled to the thrust link-lever 402, such as a point where a first link pin 426 passes through a first link aperture 424 so as to couple the first thrust link 404 to the thrust link-lever 402. The second load point load 702 may correspond to a point on the thrust link-lever 402 where the second thrust link 406 is coupled to the thrust link-lever 402, such as a point where a second link pin 430 passes through a second link aperture 428 so as to couple the second thrust link 406 to the thrust link-lever 402. However, in some embodiments the first and/or second load points 700, 702 may be located elsewhere on the thrust link-lever 402, such as at a location that offset from and/or that is not centered on the respective link pins 426, 430 and/or link apertures 424, 428. Additionally, or in the alternative, for the first and second load points 700, 702 may be located accordingly at respective locations of a thrust link-lever 402 that defines a portion of a monolithic body, e.g., together with the respective thrust links 404, 406.

Now turning to FIGS. 8A and 8B, and also referring to FIGS. 9A and 9B, and FIG. 10, engine-mounting linkage systems 300 that have an adjustable fulcrum position 600 will be described. As shown, a thrust mount assembly 400 may include a thrust link-lever 402 with an adjustable fulcrum position 600. By adjusting the fulcrum position 600, the fulcrum position 600 may be laterally offset, such that a first lever arm (a) 602, defined from the fulcrum position 600 and extending towards the first thrust link 404, differs from a second lever arm (b) 604, defined from the fulcrum position 600 and extending towards the second thrust link 406. It will be appreciated that a fulcrum position 600 is defined with relation to corresponding lever arms 602, 604, and vice versa. Thus, a fulcrum position 600 may be adjusted by changing the location of the fulcrum position 600, resulting in a corresponding change in the length of the respective lever arms 602, 604 with relation to the fulcrum position 600. Additionally, or in the alternative, a fulcrum position may be adjusted by changing the length of a lever arm (e.g., the first lever arm (a) 602 and/or the second lever arm (b) 604), resulting in a corresponding change in the location of the fulcrum position 600 with relation to the corresponding lever arms 602, 604.

Figure 8A:
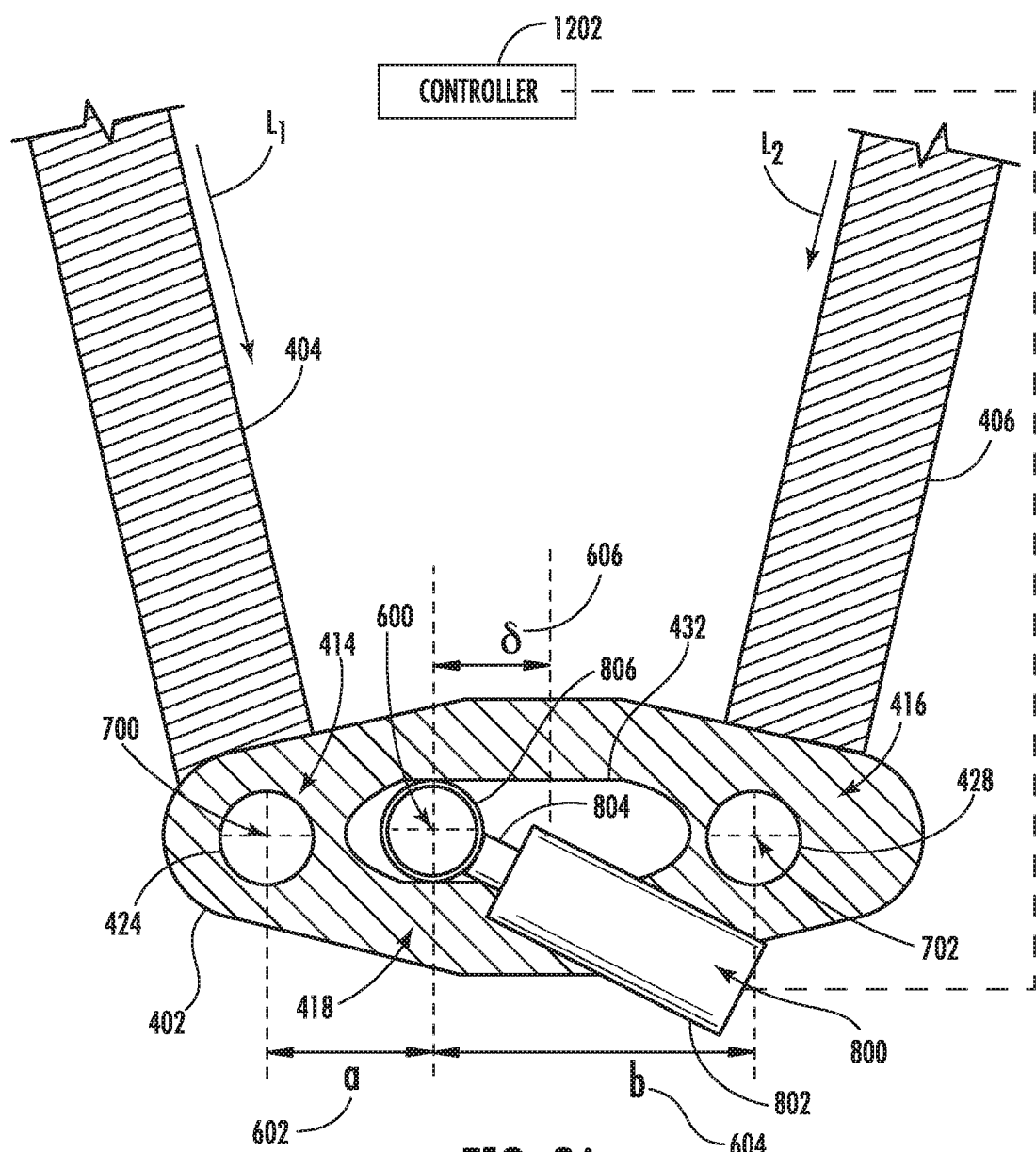
FIG. 8A schematically depicts an exemplary thrust mount assembly with a thrust link-lever that includes an adjustable fulcrum position.
Figure 8B:
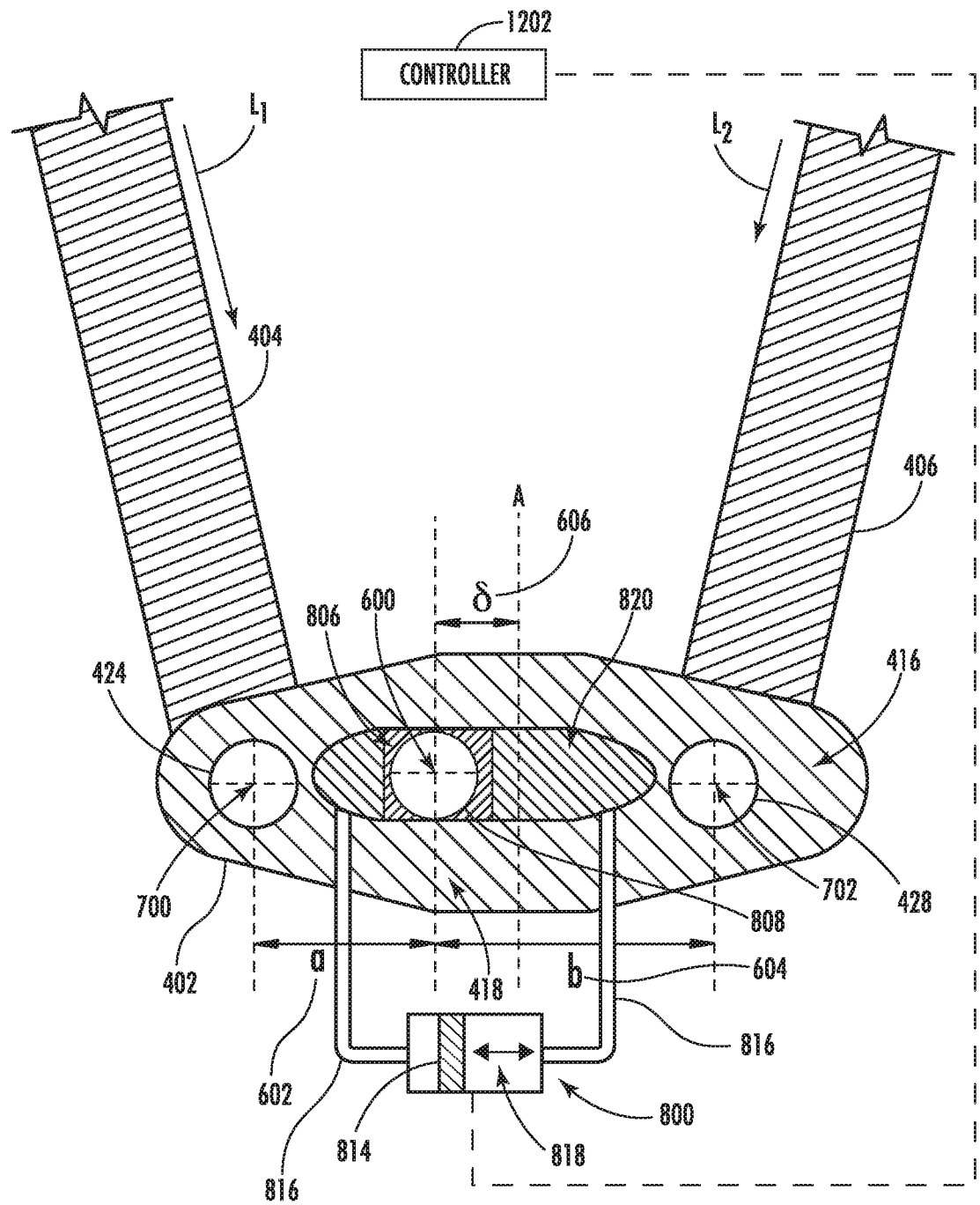
FIG. 8B schematically depicts another exemplary thrust mount assembly with a thrust link-lever that includes an adjustable fulcrum position.

For example, FIGS. 8A and 8B respectively show exemplary engine-mounting linkage systems 300 in which the location of the fulcrum aperture 432 may be adjusted, such as to a plurality of locations of the fulcrum region 418 of the thrust link-lever 402. As another example, FIGS. 9A and 9B respectively show exemplary engine-mounting linkage systems 300 in which the fulcrum position 600 may be a fixed position, and the location of a link aperture (e.g., a first link aperture 424 and/or a second link aperture 428) may be adjusted, such as to a plurality of locations of the respective end region (e.g., the first end region 414 and/or the second end region 416) of the thrust link-lever 402. As yet another example, FIG. 10 shows an exemplary engine mounting linkage system 300 in which the fulcrum position 600 may be a fixed position, and the lateral length of a thrust link-lever 402 may be adjusted. With the configuration shown in FIG. 10, an adjustment to the lateral length of the thrust-link lever 402 may change the length of a lever arm 602, 604 while the fulcrum position 600 remains fixed. However, the presently disclosed fulcrum position 600 may be provided by other suitably adjustable components of an engine-mounting linkage system 300, all of which are within the scope of the present disclosure. For example, an aft engine-mount 316 may include a fulcrum body 420 in which the location of a fulcrum pin 422 may be adjusted, such as to a plurality of locations of the fulcrum body 422. As another example, the location at which the aft engine-mount is coupled to a pylon may be adjusted. These and other suitable configurations and assemblies for laterally offsetting the fulcrum position 600 relative to the axis A may be provided in various exemplary embodiments in accordance with the present disclosure.

In some embodiments, an engine-mounting linkage system 300 may include an actuator 800 operable to change a location of a fulcrum position 600. The actuator 800 may operate by way of any suitable input, such as a mechanical, electrical, hydraulic, or pneumatic input, as well as combinations of these. For example, as shown for example in FIGS. 8A and 9A, the actuator 800 may include a servomotor, a solenoid, a piezoelectric element, a piston, a gear assembly, or the like. The actuator may include an actuator body 802 and an actuator arm 804. As shown in FIG. 8A, the actuator arm 804 may include or may be coupled to a fulcrum mount 806 fitted within the fulcrum aperture 432. The fulcrum aperture 432 may have an elongate shape that provides a pathway for the fulcrum mount 806 to move to selected locations of the fulcrum region 418. The fulcrum mount 806 may include a fulcrum pin-aperture 808 configured to receive a fulcrum pin 422 operable to couple the thrust link-lever 402 to a fulcrum body 420 of an aft engine-mount a 316.

Figure 9A:
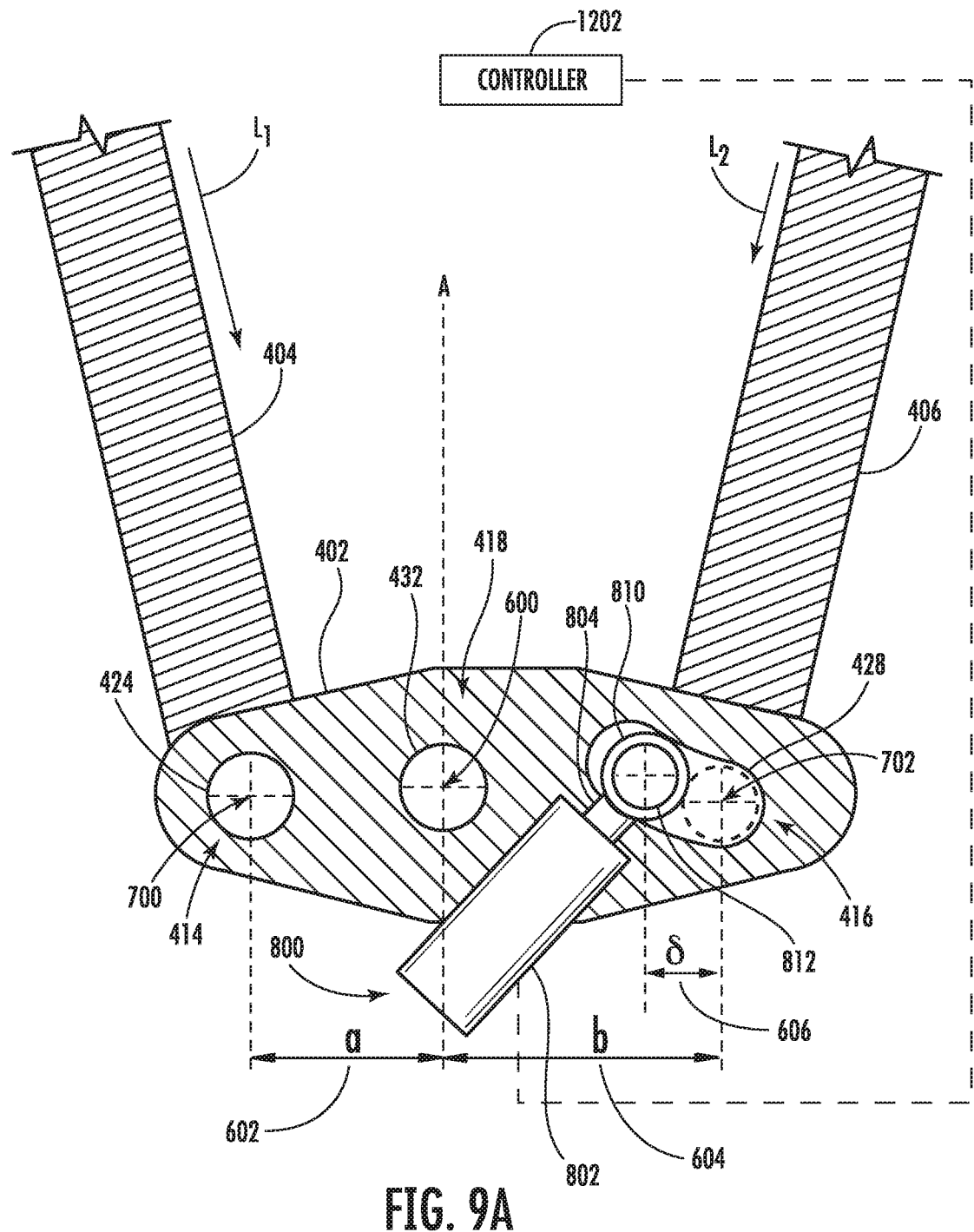
FIG. 9A schematically depicts yet another exemplary thrust mount assembly with a thrust link-lever that includes a fixed fulcrum position.

As shown in FIG. 9A, the actuator arm 804 may include or may be coupled to a thrust link-mount 810 fitted within a link aperture (e.g., the first link aperture 424 or the second link aperture 428). The link aperture, such as the second link aperture 432 as shown, may have an elongate shape that provides a pathway for the thrust link-mount 810 to move to selected locations about an end region (e.g., the second end region 416) of the thrust link-lever 402. The thrust link-mount 810 may include a link pin-aperture 812 configured to receive a link pin (e.g., the second link pin 430) operable to couple a thrust link (e.g., the second thrust link 406) to the end region (e.g., the second end region 416) of the thrust link-lever 402.

Figure 9B:
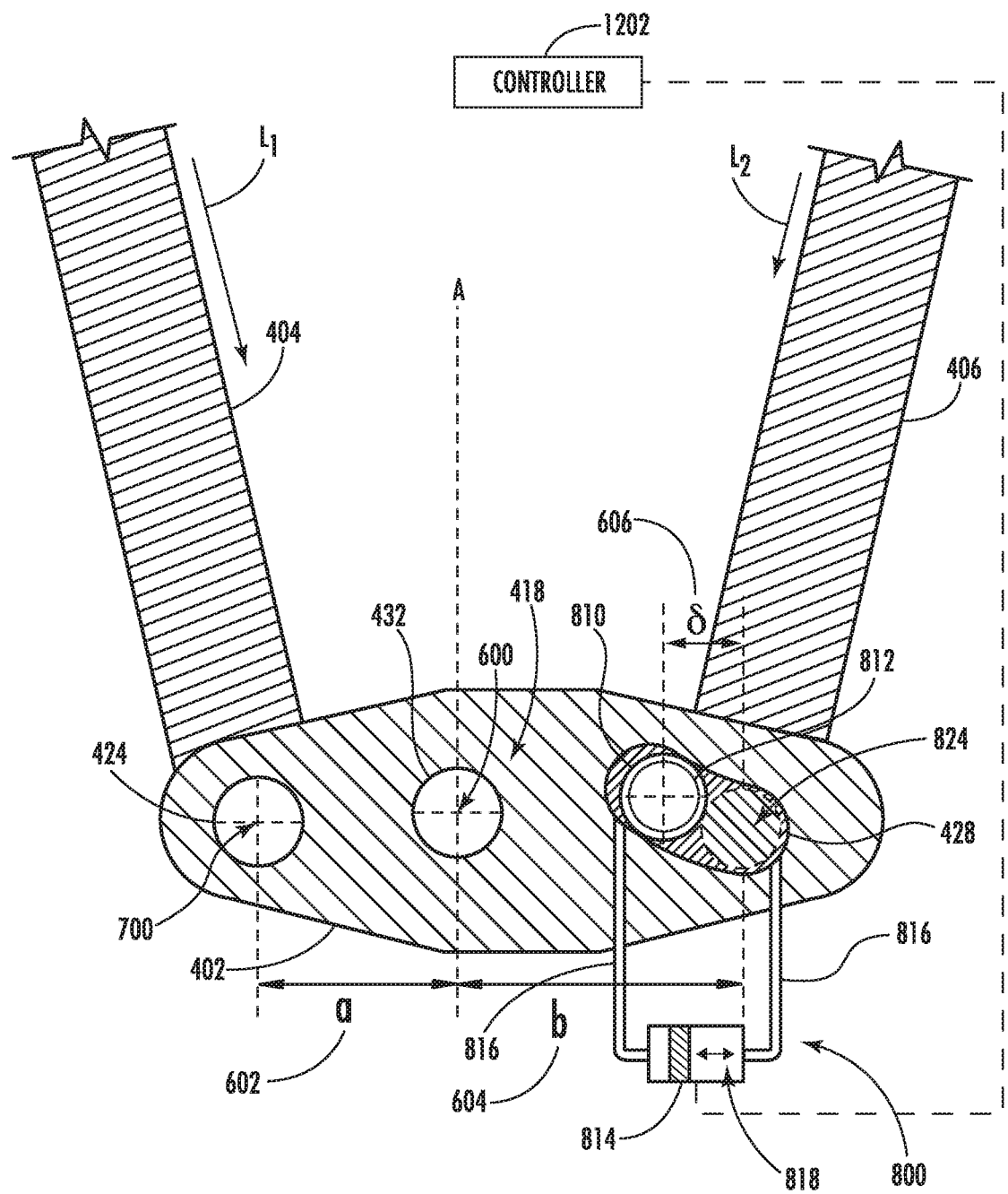
FIG. 9B schematically depicts yet another exemplary thrust mount assembly with a thrust link-lever that includes a fixed fulcrum position.

FIGS. 8B and 9B show another exemplary embodiment of an engine-mounting linkage system 300 that includes an actuator 800 operable to change a location of a fulcrum position 600. The actuator shown in FIGS. 8B and 9B may operate at least in part by way of hydraulic and/or pneumatic input.

For example, the actuator 800 may include a piston 814 or other actuator mechanism. One or more actuator fluid lines 816 may provide fluid communication between a piston chamber 818 and a lever chamber 820. The lever chamber 820 may be defined at least in part by the fulcrum aperture 432. By actuating the piston 814, fluid moves from the piston chamber 818 to the lever chamber 820, and/or vice versa, the fulcrum mount 806 moves along a pathway defined by the elongate shape of the lever chamber 820 and/or the fulcrum aperture 432, thereby laterally adjusting the position of the fulcrum mount 806 to selected locations of the fulcrum region 418. The fulcrum mount 806 may include a fulcrum pin-aperture 808 configured to receive a fulcrum pin 422 operable to couple the thrust link-lever 402 to a fulcrum body 420 of an aft engine-mount a 316.

As shown in FIG. 9B, the one or more actuator fluid lines 816 may provide fluid communication between a piston chamber 818 and a thrust-link chamber 822. One or more actuator fluid lines 816 may provide fluid communication between a piston chamber 818 and a thrust-link chamber 824. The thrust-link chamber 824 may be defined at least in part by a link aperture (e.g., the first link aperture 424 or the second link aperture 428). In the embodiment shown, actuating the piston 814 causes fluid to move from the piston chamber 818 to the thrust-link chamber 824, and/or vice versa, thereby moving the fulcrum mount 806 along a pathway defined by the elongate shape of the thrust-link chamber 824 and/or the link aperture 424, 428. The thrust link-mount 810 may include a link pin-aperture 812 configured to receive a link pin (e.g., the second link pin 430) operable to couple a thrust link (e.g., the second thrust link 406) to the end region (e.g., the second end region 416) of the thrust link-lever 402.

Figure 10:
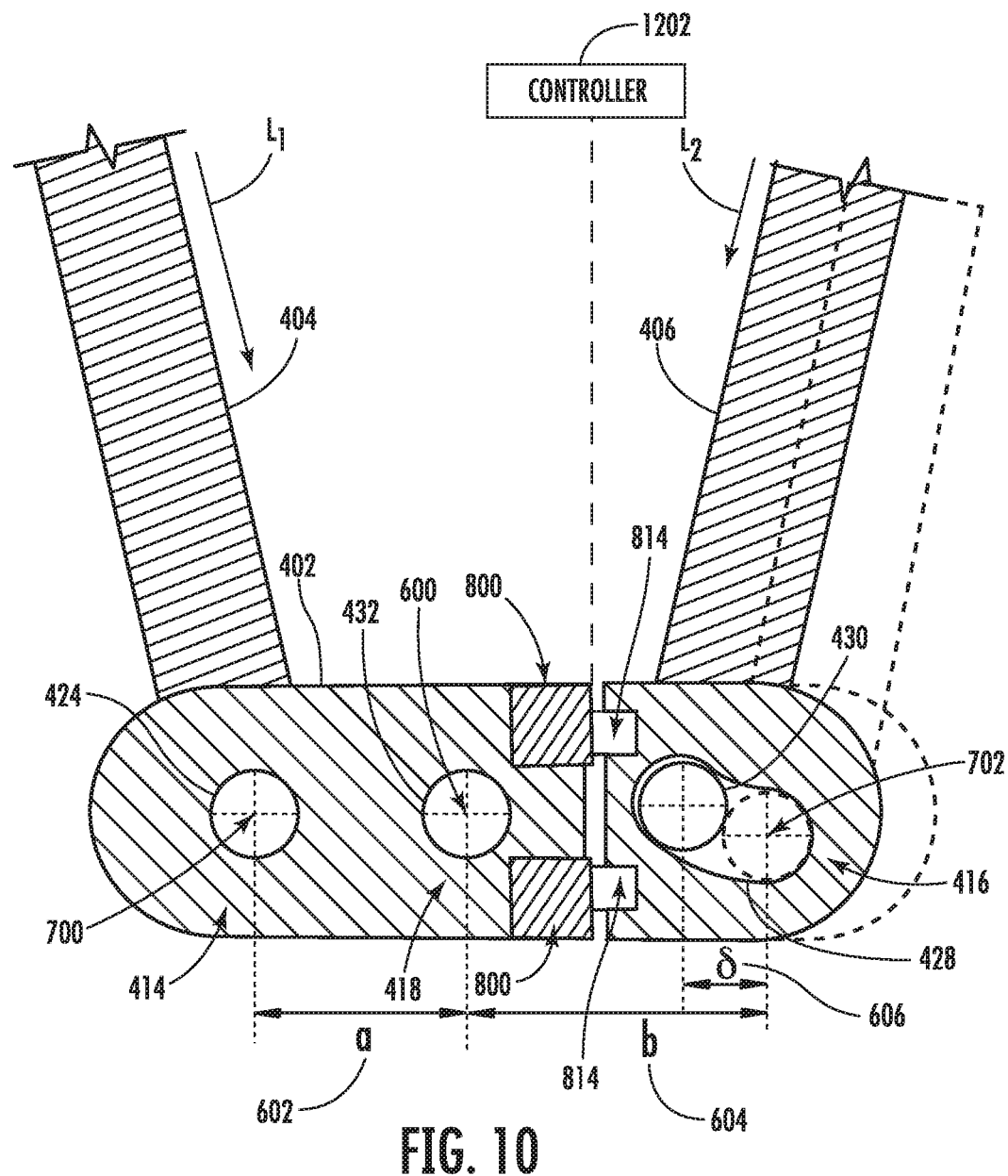
FIG. 10 schematically depicts yet another exemplary thrust mount assembly with a thrust link-lever that includes a fixed fulcrum position.

In another exemplary embodiment, as shown in FIG. 10, an actuator 800 may be operable to change the length of a thrust link-lever 402, thereby changing the length of a lever arm 602, 604 and/or fulcrum position 600. The actuator 800 operate by way of any suitable input, such as a mechanical, electrical, hydraulic, or pneumatic input, as well as combinations of these. For example, the actuator 800 may include a servomotor or other rotary or linear actuator mechanism. Additionally, or in the alternative, the actuator 800 may include a piston 814 or other actuator mechanism operable by way of hydraulic and/or pneumatic input. The link aperture, such as the second link aperture 432 as shown, may have an elongate shape that provides a pathway for the thrust link-mount 810 to move to selected locations about an end region (e.g., the second end region 416) of the thrust link-lever 402. The thrust link-mount 810 may include a link pin-aperture 812 configured to receive a link pin (e.g., the second link pin 430) operable to couple a thrust link (e.g., the second thrust link 406) to the end region (e.g., the second end region 416) of the thrust link-lever 402.

Figure 11:
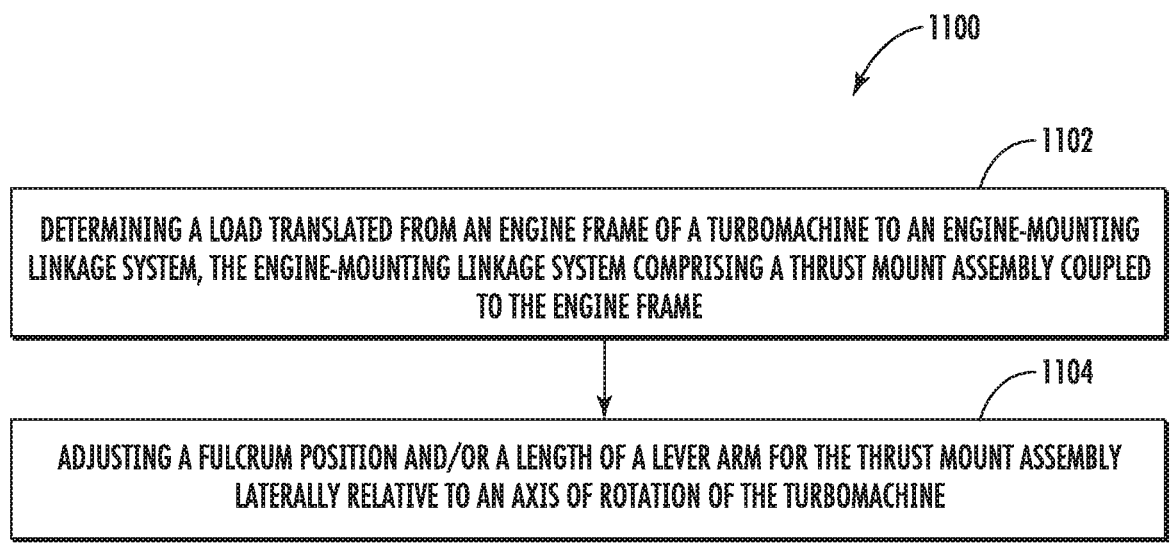
FIG. 11 shows a flowchart depicting an exemplary method of balancing a load in an engine frame of a turbomachine.

Now turning to FIG. 11, exemplary methods of balancing a load (e.g., a bending moment) in an engine frame 306 of a turbomachine will be described. An exemplary method 1100 may include, at block 1102, determining a load translated from an engine frame 306 of a turbomachine to an engine-mounting linkage system 300. The load may be determined by a control system, such as using data from one or more controllers. Additionally, or in the alternative, the load may be determined using a model, such as a machine learned model. The engine-mounting linkage system 300 may include a thrust mount assembly 400 coupled to an engine frame 306 (e.g., a forward frame 308 and/or an aft frame 310). The thrust mount assembly 400 may include a thrust link-lever 402 that has a first end region 414, a second end region 416, and a fulcrum region 418 disposed between the first end region 414 and the second end region 416. The thrust mount assembly 400 may additionally include a first thrust link 404 coupled to the first end region 414, and a second thrust link 406 coupled to the second end region 416, and an aft engine-mount 316 comprising a fulcrum body 420, with the thrust link-lever 402 coupled to the fulcrum body 420 of the aft engine-mount 316 at a fulcrum position 600. At least a portion of the load is translated from the engine frame 306 to the engine-mounting linkage system 300 at least in part through the first thrust link 404 and the second thrust link 406.

An exemplary method 1100 may additionally include, at block 1104, adjusting a fulcrum position 600 and/or a length of a lever arm (e.g., the first lever arm (a) 602 and/or the second lever arm (b) 604), for the thrust mount assembly laterally relative to an axis of rotation of the turbomachine. The lateral adjustment of the fulcrum position 600 may provide a first lever arm 602 defined from the fulcrum position 600 and extending towards the first thrust link 404 that differs from a second lever arm 804 defined from the fulcrum position 600 and extending towards the second thrust link 406. The fulcrum position 600 may be selected at least in part to balance the at least a portion of the load translated from the engine frame 306 to the engine-mounting linkage system 300 through the first thrust link 404 and the second thrust link 406. In some embodiments, the load may include a thrust load $F_T$ and/or horizontal load $F_H$ incident upon the engine frame 306. Thus, block 1102 may include determining a thrust load $F_T$ and/or a horizontal load $F_H$ incident upon the engine frame 306. Block 1104 may include adjusting the fulcrum position 600 based at least in part on the thrust load $F_T$ and/or the horizontal load $F_H$ incident upon the engine frame 306.

In some embodiments, adjusting the fulcrum position 600 and/or the length of a lever arm 602, 604 may include moving a fulcrum pin 422 to a selected position within a fulcrum aperture 432. The fulcrum pin 422 may be configured to connect a thrust link-lever 402 to a fulcrum body 420 of an aft engine-mount 316 at the fulcrum position 600 of the thrust link-lever 402. Additionally, or in the alternative, adjusting the fulcrum position 600 and/or the length of a lever arm 602, 604 may include moving a link pin (e.g., a first link pin 426 and/or a second link pin 430) to a selected position within a link aperture (e.g., a first link aperture 424 and/or a second link aperture 428). The first link pin 426 may connect the first thrust link 404 to the first end region 414 of the thrust link-lever 402 and/or the second link pin 430 may connect the second thrust link 406 to the second end region 416 of the thrust link-lever 402.

In some embodiments, the magnitude of a load (e.g., and corresponding bending moment) may depend on contributions from the various load vectors. The fulcrum position 600 may be varied, for example, to correspond to differing load vectors associated with various flight conditions and/or engine operating conditions. An adjustment to the fulcrum position 600 may thereby at least partly counteract one or more moments associated with such flight conditions and/or engine operating conditions. By way of example, the horizontal load $F_H$, may depend at least in part on the thrust load $F_T$ of the engine. The thrust load $F_T$ may vary as between different flight conditions, and as a result, an engine-induced horizontal load $F_H$ caused by rotational operation of the turbine engine 100 may vary correspondingly.

Figure 12:
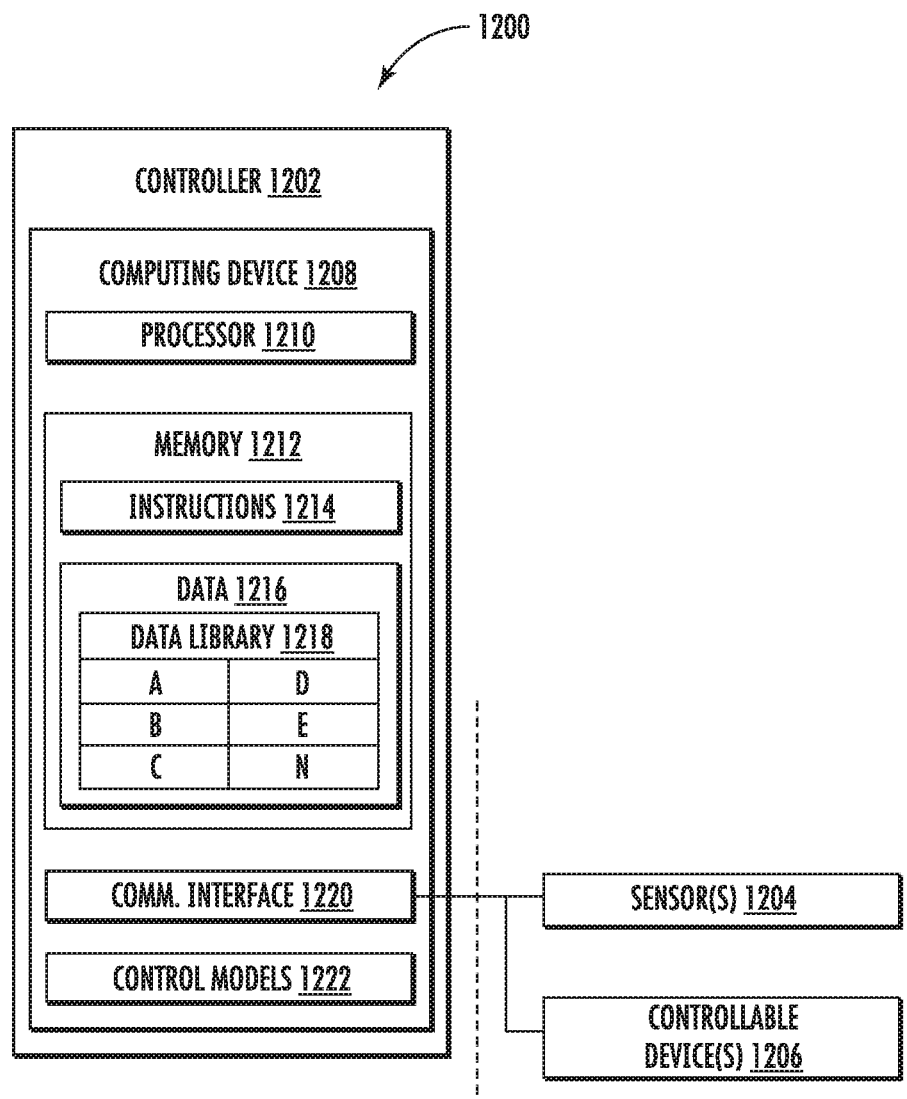
FIG. 12 shows a block diagram of a control system for controlling a fulcrum position in an engine-mounting linkage system that includes a thrust mount assembly.

Now turning to FIG. 12, and exemplary control system 1200 for use in accordance with the present disclosure will be described. An exemplary control system 1200 may be configured to balance a load (e.g., a bending moment) in an engine frame 306 of a turbomachine. For example, the control system 1200 may be utilized in the exemplary methods 1100 described with reference to FIG. 11.

The control system 1200 can include one or more controllers 1202 configured to monitor and control various aspects of an engine-mounting linkage system 300, such as any of the engine-mounting linkage systems 300 described herein. The control system 1200 may control a fulcrum position and/or lever arm to balance a load (e.g., a bending moment), minimize engine bending, or to optimize another engine parameter in real time, such as specific fuel consumption. The fulcrum position and/or lever arm may be controlled to achieve a desired output or optimal parameter. The control system 1200 may be configured to control an engine-mounting linkage system for mounting an aircraft engine to an engine support structure (e.g., a pylon on a wing) of an aircraft, as well as other types of vehicles or static structures as well. In exemplary embodiments, the control system 1200 may be communicatively coupled with one or more sensors 1204 and/or one or more controllable devices 1206 such as an actuator 800.

The one or more sensors 1204 may be any suitable type of sensor, including without limitation, a strain gauge (e.g., a strain gauge configured to determine a strain on the engine frame 306); a thermocouple (e.g., a thermocouple temperature at various stations of the engine); a pressure sensor (e.g., a pressure sensor configured to determine a pressure at one or more stations of a turbine engine 100); an optical position sensor (e.g., an optical position sensor configured to determine a fulcrum position 600 and/or a length of a lever arm 602, 604); and/or a clearanceometer (e.g., a clearanceometer configured to determine a clearance between rotating components and stationary components of a turbine engine 100). For example, one or more clearanceometers may be configured to determine blade tip clearance between fan blades 136 and the fan casing 146, and/or between turbine blades 166, 170 and corresponding shrouds, etc. The control command may be determined based at least in part on a load and/or a specific fuel consumption having been determined in the exemplary method 1100 described with respect to FIG. 11.

The sensors 1204 may be mounted to a turbine engine 100 and/or an engine support structure 302 at any suitable location. For example, sensors 1204 may be mounted to the forward and/or aft fan case, booster casings, flanges, and/or internal structures thereof. As another example, sensors 1204 may be mounted to the fan frame and/or front frame casings, flanges, and internal structures thereof, e.g., the outlet guide vanes. As a further example, sensors 1204 may be mounted to the core engine casings, flanges, and internal structures thereof. As yet other examples, sensors 1204 may be mounted to the mid frame casing, flanges, and/or internal structures thereof, the LPT casings, flanges, and/or internal structures thereof, and/or the rear frame casing, flanges, and/or internal structures thereof. In some embodiments, For example, a strain gage may be mounted to the backbone of the turbine engine 100 and/or to the engine support structure 300.

The one or more sensors 1204 may sense one or more operating parameters. For example, the operating parameters may include an ambient temperature, a compressor discharge temperature, an inlet low pressure compressor temperature, an angle of attack of the aircraft to which the engine is mounted, an angle of attack of an aircraft to which the engine is mounted, an airspeed, a current actuator setting or position, strain on the backbone of the engine, among other possible operating parameters. The sensors 1204 may sense their respective operating parameters continuously during operation of the engine, at a predetermined interval, etc. Thus, the sensors 1204 may repeatedly sense their respective operating parameters. Signals from the sensors 1204 may be routed to the controllers 1202 for processing.

The one or more controllable devices 1206 may be associated with one or more features of an engine-mounting linkage system 300, such as an actuator 800 operable to change a location of a fulcrum position 600 of a thrust mount assembly 400 and/or a length of a lever arm 602, 604 of a thrust mount assembly 400. By way of example, a controllable device 1206 such as an actuator 800 may be configured to change a location of the fulcrum 600 position and/or a length of a lever arm 602, 604 in response to a control command from a controller 1202.

During operation of an engine, the control system 1200 may monitor one or more operating parameters using one or more sensors 1204, calculating parameters based at least in part on the received sensor outputs, and/or using one or more models. Example operating parameters that may be determined, calculated, and/or modeled include an ambient temperature, an exhaust gas temperature, a compressor discharge temperature, an inlet low pressure compressor temperature, a specific fuel consumption, an engine efficiency, an angle of attack of the aircraft to which the engine is mounted, an angle of attack of an aircraft to which the engine is mounted, a Mach number, a thrust, an airspeed, a fan flow, a core flow, a current actuator setting or position, a fan speed, a core speed, an engine inlet pressure, a bypass passage pressure, an inlet high pressure compressor pressure, a compressor discharge pressure, a high pressure turbine pressure, an accelerometer measurement, a flight control position, and/or one or more waypoints of a mission (e.g., the origin, the destination, and one or more points therebetween).

In some embodiments, the one or more controllers 1202 may be engine controllers. Particularly, the one or more controllers 1202 may be, for example, Electronic Engine Controllers (EEC) or Electronic Control Units (ECU). Further, in some embodiments, the one or more engine controllers 1202 may be incorporated into a Full Authority Digital Engine Control (FADEC) system of a vehicle, such as an aircraft. In some embodiments, the one or more controllers 1202 may be configured to control one or more operations of an engine-mounting linkage system 300. The one or more controllers 1202 may include a system of controllers or a single integrated controller. In yet other embodiments, the one or more controllers 1202 may some other computing devices onboard the vehicle to which the engine is mounted.

The controller 1202 may include one or more computing devices 1208, which may be located locally or remotely relative to the one or more controllers 1202. The one or more computing devices 1208 may include one or more processors 1210 and one or more memory devices 1212. The one or more processor(s) 1210 and associated memory device(s) 1212 may be configured to perform a variety of computer-implemented functions and/or instructions (e.g., performing the methods, steps, calculations and the like and storing relevant data as disclosed herein). The instructions, when executed by the one or more processors, may cause the one or more processor(s) 1210 to perform operations, including determining and providing control commands to various controllable devices 1206 of the engine-mounting linkage system 300.

The one or more processors 1210 may include any suitable processing device, such as a microprocessor, microcontroller, integrated circuit, logic device, and/or other suitable processing device. As used herein, the term "processor" refers not only to integrated circuits referred to in the art as being included in a computing device, but also refers to a controller, a microcontroller, a microcomputer, a programmable logic controller (PLC), an application specific integrated circuit, and other programmable circuits. The one or more processors may also be configured to complete computations associated with executing advanced algorithms.

The one or more memory devices 1212 may include one or more computer-readable media, including but not limited to RAM, ROM, hard drives, flash drives, and/or other memory devices. The one or more memory devices 1212 may store information accessible by the one or more processors 1210, including machine-executable instructions 1214 that can be executed by the one or more processors 1210. The instructions 1214 may include any set of instructions which when executed by the one or more processors 1210 cause the one or more processors 1210 to perform operations. In some embodiments, the instructions 1214 may be configured to cause the one or more processors 1210 to perform operations for which the controller 1202 and/or the one or more computing devices 1208 are configured.

The memory devices 1212 may store data 1216 accessible by the one or more processors 1210. The data 1216 can include current or real-time data, past data, or a combination thereof. The data 1216 may be stored in a data library 1218. As examples, the data 1216 may include data associated with or generated by an engine 100, including data 1216 associated with or generated by a controller 1202, a sensor 1204, and/or a controllable device 1206 such as an actuator 800.

The one or more computing devices 1208 may also include a communication interface 1220, which may be used for communications with the sensor(s) 1204 and/or the controllable device(s) 1206. The communication interface 1220 may include any suitable components for interfacing with one or more network(s), including for example, transmitters, receivers, ports, controllers, antennas, and/or other suitable components. The communication interface 1220 may include, for example, a local area network (LAN), a wide area network (WAN), SATCOM network, VHF network, a HF network, a Wi-Fi network, a WiMAX network, a gatelink network, and/or any other suitable communication network 1020 for transmitting messages to and/or from the controller 1202.

The controller 1202 may include one or more control models 1222, which may utilize the data 1216, including the data library 1218, and/or other data sets, parameters, outputs, information associated with the control system 1200.

In some embodiments, in performing the operations, the one or more processors 1210 may be configured to determine a control command based at least in part on an output received from the one or more sensors 1204 and cause a controllable device 1206 (e.g., an actuator 800) to change a location of the fulcrum position 600 and/or a length of a lever arm 602, 604 of a thrust mount assembly 400 based at least in part on the determined control command. By changing the location of the fulcrum position 600 and/or the length of a lever arm 602, 604, advantageously, a load in an engine frame 306 including a horizontal or lateral load and/or corresponding bending moment, may be at least partially balanced. In some embodiments, the fulcrum position 600 and/or the length of a lever arm 602, 604 located at an optimum position for various operating conditions of the engine, which may provide improved specific fuel consumption and improved operability as compared to engine-mounting systems with a thrust mount assembly that does not have a laterally offset fulcrum position and/or an adjustable fulcrum position.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For example, processes discussed herein can be implemented using a single computing device or multiple computing devices working in combination. Databases, memory, instructions, and applications can be implemented on a single system or distributed across multiple systems. Distributed components can operate sequentially or in parallel.

Further aspects of the present disclosure are provided by the subject matter of the following clauses:

1. A thrust mount assembly for a turbomachine, comprising: a thrust link-lever having a first end region, a second end region, and a fulcrum region disposed between the first end region and the second end region; a first thrust link coupled or couplable to the first end region; a second thrust link coupled or couplable to the second end region; and an aft engine-mount comprising a fulcrum body, the thrust link-lever coupled or couplable to the fulcrum body of the aft engine-mount at a fulcrum position of the thrust link-lever, wherein when coupled to a turbomachine, the fulcrum position of the thrust link-lever is laterally offset and/or laterally adjustable relative to an axis of rotation of the turbomachine.

2. The thrust mount assembly of any preceding clause, wherein the thrust link-lever is configured to provide an adjustable fulcrum position, the adjustable fulcrum position providing a first lever arm defined from the fulcrum position and extending towards the first thrust link that differs from a second lever arm defined from the fulcrum position and extending towards the second thrust link.

3. The thrust mount assembly of any preceding clause, wherein the fulcrum region comprises a fulcrum aperture, the fulcrum aperture having an elongate shape configured to receive a fulcrum pin, the fulcrum pin being movable within the fulcrum aperture at least in part laterally relative to the axis of rotation of the engine.

4. The thrust mount assembly of any preceding clause, comprising the fulcrum pin being coupled or couplable to an actuator and movable within the fulcrum aperture by operation of the actuator.

5. The thrust mount assembly of any preceding clause, wherein the actuator comprises a linear actuator, and/or wherein the actuator comprises a hydraulic or pneumatic actuator.

6. The thrust mount assembly of any preceding clause, wherein the fulcrum aperture defines a lever chamber and wherein the thrust mount assembly comprises a fulcrum mount disposed within the lever chamber and configured to receive the fulcrum pin, the fulcrum mount being movable within the lever chamber at least in part by operation of a fluid from a piston chamber in fluid communication with the lever chamber.

7. The thrust mount assembly of any preceding clause, wherein the fulcrum position is a fixed position.

8. The thrust mount assembly of any preceding clause, wherein the second end region comprises a link aperture, the link aperture having an elongate shape configured to receive at least a portion of a link pin, the link pin being movable within the second link aperture at least in part laterally relative to the axis of rotation of the turbomachine.

9. The thrust mount assembly of any preceding clause, comprising the link pin being coupled or couplable to an actuator and movable within the link aperture by operation of the actuator.

10. The thrust mount assembly of any preceding clause, wherein the actuator comprises a linear actuator, and/or wherein the actuator comprises a hydraulic or pneumatic actuator 11. The thrust mount assembly of any preceding clause, wherein the link aperture defines a thrust-link chamber and wherein the thrust mount assembly comprises a thrust link-mount disposed within the thrust-link chamber, the thrust link-mount comprising a link aperture configured to receive a link pin connecting the first thrust link to the thrust link-mount, the thrust link-mount being movable within the thrust-link chamber at least in part by operation of a fluid from a piston chamber in fluid communication with the thrust-link chamber.

12. The thrust mount assembly of any preceding clause, wherein the thrust-link lever has an adjustable length.

13. The thrust mount assembly of any preceding clause, comprising: an actuator operable to change the length of the thrust-link lever.

14. The thrust mount assembly of any preceding clause, wherein the fulcrum position is selected at least in part to balance a bending moment in an engine frame of a turbomachine.

15. A method of balancing a load in an engine frame of a turbomachine, the method comprising: determining a load translated from an engine frame of a turbomachine to an engine-mounting linkage system, the engine-mounting linkage system comprising a thrust mount assembly coupled to the engine frame; and adjusting a fulcrum position for the thrust mount assembly laterally relative to an axis of rotation of the turbomachine.

16. The method of any preceding clause, wherein adjusting the fulcrum position provides a first lever arm defined from the fulcrum position and extending towards the first thrust link that differs from a second lever arm defined from the fulcrum position and extending towards the second thrust link, wherein the fulcrum position is selected at least in part to balance the at least a portion of the load translated from the engine frame to the engine-mounting linkage system through the first thrust link and the second thrust link.

17. The method of any preceding clause, wherein the thrust mount assembly comprises: a thrust link-lever having a first end region, a second end region, and a fulcrum region disposed between the first end region and the second end region; a first thrust link coupled or couplable to the first end region; a second thrust link coupled or couplable to the second end region; and an aft engine-mount comprising a fulcrum body, the thrust link-lever coupled to the fulcrum body of the aft engine-mount at a fulcrum position of the thrust link-lever, the fulcrum position of the thrust link-lever being laterally adjustable relative to an axis of rotation of the turbomachine, wherein at least a portion of the load is translated from the engine frame to the engine-mounting linkage system through the first thrust link and the second thrust link.

18. The method of any preceding clause, wherein adjusting the fulcrum position comprises: moving a fulcrum pin to a selected position within a fulcrum aperture, the fulcrum pin connecting the thrust link-lever to the fulcrum body of the aft engine-mount at the fulcrum position of the thrust link-lever; and/or moving a link pin to a selected position within a link aperture, the link pin connecting the first thrust link to the first end region of the thrust link-lever or connecting the second thrust link to the second end region of the thrust link-lever.

19. The method of any preceding clause, comprising: determining a thrust load $F_T$ and/or an inlet load $F_I$ incident upon the engine frame; and adjusting the fulcrum position based at least in part on the thrust load $F_T$ and/or the inlet load $F_I$ incident upon the engine frame.

20. An engine assembly secured to an aircraft, the engine assembly, comprising: an aircraft engine comprising a forward frame and an aft frame; an engine support structure of an aircraft, the engine support structure defining a location for mounting the aircraft engine to the aircraft; a forward engine mount connecting the forward frame of the engine to the engine support structure of the aircraft; an aft engine mount connecting the aft frame of the engine to the engine support structure of the aircraft; and a thrust mount assembly, comprising: a thrust link-lever having a first end region, a second end region, and a fulcrum region disposed between the first end region and the second end region; a first thrust link coupled or couplable to the first end region; a second thrust link coupled or couplable to the second end region; and an aft engine-mount comprising a fulcrum body, the thrust link-lever coupled or couplable to the fulcrum body of the aft engine-mount at a fulcrum position of the thrust link-lever, wherein the fulcrum position of the thrust link-lever is laterally offset and/or laterally adjustable relative to an axis of rotation of the aircraft engine.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to describe the presently disclosed subject matter, including the best mode, and also to enable any person skilled in the art to practice the presently disclosed subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A thrust mount assembly for a turbomachine, comprising:
   a thrust link-lever having a first end region, a second end region, and a fulcrum region disposed between the first end region and the second end region;
   a first thrust link coupled or couplable to the first end region;
   a second thrust link coupled or couplable to the second end region; and
   an aft engine-mount comprising a fulcrum body, the thrust link-lever coupled or couplable to the fulcrum body of the aft engine-mount at a fulcrum position of the thrust link-lever,
   wherein when coupled to the turbomachine, the fulcrum position of the thrust link-lever is laterally offset and/or laterally adjustable relative to an axis of rotation of the turbomachine, and
   wherein a first lever arm defined from the fulcrum position and extending towards the first thrust link differs in length from a second lever arm defined from the fulcrum position and extending towards the second thrust link.

2. The thrust mount assembly of claim 1, wherein the thrust link-lever is configured to provide an adjustable fulcrum position.

3. The thrust mount assembly of claim 1, wherein the fulcrum region comprises a fulcrum aperture, the fulcrum aperture having an elongate shape configured to receive a fulcrum pin, the fulcrum pin being movable within the fulcrum aperture at least in part laterally relative to the axis of rotation of the turbomachine.

4. The thrust mount assembly of claim 3, comprising the fulcrum pin being coupled or couplable to an actuator and movable within the fulcrum aperture by operation of the actuator.

5. The thrust mount assembly of claim 4, wherein the actuator comprises a linear actuator, and/or wherein the actuator comprises a hydraulic or pneumatic actuator.

6. The thrust mount assembly of claim 3, wherein the fulcrum aperture defines a lever chamber and wherein the thrust mount assembly comprises a fulcrum mount disposed within the lever chamber and configured to receive the fulcrum pin, the fulcrum mount being movable within the lever chamber at least in part by operation of a fluid from a piston chamber in fluid communication with the lever chamber.

7. The thrust mount assembly of claim 1, wherein the fulcrum position is a fixed position.

8. The thrust mount assembly of claim 7, wherein the second end region comprises a link aperture, the link aperture having an elongate shape configured to receive at least a portion of a link pin, the link pin being movable within the link aperture at least in part laterally relative to the axis of rotation of the turbomachine.

9. The thrust mount assembly of claim 8, comprising the link pin being coupled or couplable to an actuator and movable within the link aperture by operation of the actuator.

10. The thrust mount assembly of claim 9, wherein the actuator comprises a linear actuator, and/or wherein the actuator comprises a hydraulic or pneumatic actuator.

11. The thrust mount assembly of claim 7, wherein the second end region comprises a link aperture that defines a thrust-link chamber and wherein the thrust mount assembly comprises a thrust link-mount disposed within the thrust-link chamber, the thrust link-mount comprising a link pin-aperture configured to receive a link pin connecting the first thrust link or the second thrust link to the thrust link-mount, the thrust link-mount being movable within the thrust-link chamber at least in part by operation of a fluid from a piston chamber in fluid communication with the thrust-link chamber.

12. The thrust mount assembly of claim 1, wherein the thrust link-lever has an adjustable length.

13. The thrust mount assembly of claim 12, comprising:
   an actuator operable to change the length of the thrust link-lever.

14. The thrust mount assembly of claim 1, wherein the fulcrum position is selected at least in part to balance a bending moment in an engine frame of the turbomachine.

15. The thrust mount assembly of claim 1, wherein when coupled to the turbomachine, the first end region is separated from the second end region by a plane including the axis of rotation of the turbomachine.

16. An engine assembly secured to an aircraft, the engine assembly, comprising:
   an aircraft engine comprising an axis of rotation, a forward frame, and an aft frame;
   an engine support structure of the aircraft, the engine support structure defining a location for mounting the aircraft engine to the aircraft;
   a forward engine mount connecting the forward frame of the aircraft engine to the engine support structure of the aircraft;
   an aft engine-mount connecting the aft frame of the aircraft engine to the engine support structure of the aircraft; and
   a thrust mount assembly, comprising:
      a thrust link-lever having a first end region, a second end region separated from the first end region by a vertically oriented plane including the axis of rotation of the aircraft engine, and a fulcrum region disposed between the first end region and the second end region;
      a first thrust link coupled or couplable to the first end region;
      a second thrust link coupled or couplable to the second end region; and
      a fulcrum body of the aft engine-mount, the thrust link-lever coupled or couplable to the fulcrum body of the aft engine-mount at a fulcrum position of the thrust link-lever,
      wherein the fulcrum position of the thrust link-lever is laterally offset and/or laterally adjustable relative to the vertically oriented plane.

17. The engine assembly of claim 16, wherein a first lever arm defined from the fulcrum position and extending towards the first thrust link differs from a second lever arm defined from the fulcrum position and extending towards the second thrust link.

18. The engine assembly of claim 16, wherein the fulcrum position is selected at least in part to balance a bending moment in an engine frame of a turbomachine.

19. The engine assembly of claim 16, further comprising a control system configured to balance a load in an engine frame of the aircraft engine, the control system comprising:
one or more sensors mounted to at least one of the aircraft engine or the engine support structure; and
a controller communicatively coupled to the one or more sensors and configured to:
receive signals from the one or more sensors to monitor one or more operating parameters; and
control one or more operations of the thrust mount assembly based on the one or more operating parameters.

20. The engine assembly of claim 19, further comprising one or more controllable devices communicatively coupled to the controller, wherein the one or more operations comprises changing a location of the fulcrum position of the thrust mount assembly with the one or more controllable devices.

21. The engine assembly of claim 19, further comprising one or more controllable devices communicatively coupled to the controller, wherein the one or more operations comprises changing, with the one or more controllable devices, a length of a lever arm defined from the fulcrum position and extending towards at least one of the first thrust link or the second thrust link.

22. The engine assembly of claim 19, wherein the one or more sensors include at least one of a strain gauge, a thermocouple, a pressure sensor, an optical position sensor, or a clearanceometer.

23. The engine assembly of claim 19, the controller further configured to:
determine at least one of a thrust load $F_T$ or an inlet load $F_I$ incident upon the engine frame; and
adjust the fulcrum position based at least in part on the thrust load $F_T$ or the inlet load $F_I$.

24. The engine assembly of claim 19, the controller further configured to:
move a fulcrum pin to a selected position within a fulcrum aperture, the fulcrum pin connecting the thrust link-lever to the fulcrum body of the aft engine-mount at the fulcrum position of the thrust link-lever.

25. The engine assembly of claim 19, the controller further configured to:
move a link pin to a selected position within a link aperture, the link pin connecting the first thrust link to the first end region of the thrust link-lever or connecting the second thrust link to the second end region of the thrust link-lever.

* * * * *